(12) United States Patent
Imaizumi et al.

(10) Patent No.: US 7,208,983 B2
(45) Date of Patent: Apr. 24, 2007

(54) IMAGE-SENSOR SIGNAL PROCESSING CIRCUIT

(75) Inventors: Eiki Imaizumi, Kodaira (JP); Takanobu Anbo, Takasaki (JP); Yasuhiko Sone, Tomioka (JP); Tatsuji Matsuura, Tokyo (JP); Teruaki Odaka, Mobara (JP)

(73) Assignee: Renesas Technology Corporation, Tokyo (JP)

( * ) Notice: Subject to any disclaimer, the term of this patent is extended or adjusted under 35 U.S.C. 154(b) by 0 days.

(21) Appl. No.: 10/855,608

(22) Filed: May 28, 2004

(65) Prior Publication Data

US 2004/0239783 A1  Dec. 2, 2004

(30) Foreign Application Priority Data

May 29, 2003  (JP) ............................. 2003-153412

(51) Int. Cl.
 *G11C 27/02* (2006.01)
(52) U.S. Cl. ......................................... 327/94; 341/122
(58) Field of Classification Search ................ 327/91, 327/93, 94, 96; 348/241, 255, 229.1, 257, 348/222.1; 341/122
See application file for complete search history.

(56) References Cited

U.S. PATENT DOCUMENTS 4,891,690 A * 1/1990 Hasegawa et al. .......... 358/514
5,457,494 A * 10/1995 Suga et al. ............... 348/229.1
5,736,886 A    4/1998 Mangelsdorf et al. ...... 327/310
5,751,354 A * 5/1998 Suzuki et al. ............... 348/349
6,546,150 B2 * 4/2003 Inui ........................... 382/278
6,801,254 B1 * 10/2004 Nishio ......................... 348/241
2002/0047934 A1  4/2002 Nitta et al .................. 348/689

FOREIGN PATENT DOCUMENTS

| JP | 2001-189892 | 7/2001 |
| JP | 2002-542679 | 12/2002 |
| WO | WO00/62530 | 10/2000 |

* cited by examiner

*Primary Examiner*—My-Trang Nu Ton
(74) *Attorney, Agent, or Firm*—Mattingly, Stanger, Malur & Brundidge, P.C.

(57) ABSTRACT

By flexibly coping with both image sensors of a CCD sensor and a CMOS sensor without providing any external circuit, a signal processing is performed. In a sensor selecting switch provided in an image-sensor signal-processing circuit, first and fourth switches are turned on when the CMOS sensor is connected, and second and third switches are turned on when the CCD sensor is connected. The sensor selecting switch is controlled by a control signal generated in a control circuit, based on sensor selection data which is stored in a register and which is data for selecting the CCD or CMOS sensor. By so doing, even if polarity of an output signal of the image sensor is reversed, a normal signal is inputted to both inputs of the CDS amplifier, whereby it is possible to flexibly cope with both of the CCD and CMOS sensors.

15 Claims, 26 Drawing Sheets

IMAGE-SENSOR SIGNAL PROCESSING CIRCUIT

CROSS-REFERENCE TO RELATED APPLICATION

The present application claims priority from Japanese Patent Application No. JP 2003-153412 filed on May 29, 2003, the content of which is hereby incorporated by reference into this application.

BACKGROUND OF THE INVENTION

The present invention relates to a semiconductor integrated circuit device and a digital camera system and, particularly, to a technique effectively applied to an analog front-end signal processing of a CCD sensor and a CMOS sensor.

The CCD (Charge Coupled Device) sensor is widely used as an electronic imaging device in such a camera system as a video camera, a digital still camera, and a camera-equipped cell phone.

In an image-sensor signal-processing circuit provided in the digital video camera, for example, it is well known that signals taken from an imaging device such as a CCD sensor are sampled with respect to color levels by a correlated double sampling circuit etc.

This correlated double sampling circuit comprises, for example, two capacitors, a buffer circuit connected to one connections of the capacitors, an external capacitor connected to an input of the buffer circuit, a D/A (Digital/Analog) converter, and a complete differential amplifier.

Black level signals and pixel signals that are output signals from the CCD sensor are individually sampled to the two capacitors. The buffer circuit applies bias voltage for compensating various offsets.

The external capacitor retains bias voltages for compensating the offsets etc. The D/A converter outputs currents for charging and discharging the external capacitor. The complete differential amplifier outputs a difference between the black level signal and the pixel signal.

Additionally, there is also another correlated double sampling circuit, which comprises two sample/hold (S/H) circuits and a subtraction circuit for outputting a differential signal between the black level signal and the pixel signal individually sampled and held (e.g., see U.S. Pat. No. 5,736,886).

The sample/hold circuits individually sample and hold the CCD sensor output signals (black level signal and pixel signal). The subtraction circuit outputs the differential signal between the black level signal and the pixel signal individually sampled and held by the sample/hold circuits.

SUMMARY OF THE INVENTION

However, the inventors of the present invention have found out the following problem in the signal processing technique using the above-mentioned image-sensor signal-processing circuit.

In recent years, with increasing demands for size reduction and high-quality image of the camera system, the CMOS sensor with a reduced size, a high quality image, and low consumption power has been in practical use as an electronic imaging device. Particularly, for high-quality image products thus far, the CCD sensor has been mainly used, but a CMOS sensor also starts being used, Since the sensor-output signal-processing circuit is indispensable for the image sensor for high-quality imaging, the above-mentioned signal-processing circuit practically used for the CCD sensor is used with respect to the CMOS sensor.

However, since the CMOS sensor has therein a light-receiving element and an analog circuit such as an amplifier, it is reversed with respect to polarity of the signal from the CCD sensor and is outputted in many cases. Therefore, an additional external component is required to cope with the sensor output of the CMOS sensor in the signal-processing circuit for the CCD sensor, and so there arises the problem of cost increase and size increase, etc. of the camera system.

An object of the present invention is to provide a semiconductor integrated circuit device capable of flexibly coping with the signal processing of both image sensors of the CCD sensor and the CMOS sensor without using any external circuits.

The above and other objects and novel characteristics of the present invention will be apparent from the description of this specification and the accompanying drawings.

The typical ones of the inventions disclosed in this application will be briefly described as follows.

A semiconductor integrated circuit device according to the present invention comprises: a black-level sample/hold amplifier sampling and holding a black-level signal outputted from either of a first or second image sensor; a sensor selecting section selecting, based on a selection control signal, each output destination of a pixel signal outputted from either of said first or second image sensor and of the black-level signal outputted from said black-level sample/hold amplifier; a first amplifying portion sampling/holding the black-level signal and the pixel signal, and amplifying the signals with a predetermined gain; a second amplifying portion provided in case where further amplification of the signals is needed, and amplifying, with a predetermined gain, the signals outputted from said first amplifying portion; and an A/D converter converting, to a digital signal, the signals outputted from said second amplifier, wherein said sensor selecting section reverses polarity of the signal outputted from either of said first or second image sensor and outputs the polarity reversed signal, thereby signal-processing, by said A/D converter used in common, the signal outputted from either of said first or second image sensor.

Also, A semiconductor integrated circuit device according to the present invention comprises: an image-sensor signal-processing circuit processing a signal outputted from either of a first or second image sensor, wherein said image-sensor signal-processing circuit includes: a first negative feedback loop presetting a black-level signal to a predetermined value by applying an offset signal in a pre-blank period, the black-level signal being inputted to a black-level sample/hold amplifier that samples/holds the black-level signal outputted from either of said first or second image sensor; and a second negative feedback loop supplying a bias voltage to said black-level sample/hold amplifier so that an output of said black-level sample/hold amplifier becomes almost equal to a predetermined bias voltage when a signal outputted from either of said first or second image sensor is inputted to said black-level sample/hold amplifier.

DESCRIPTION OF THE PREFERRED EMBODIMENTS

Hereinafter, embodiments of the present invention will be described in detail with reference to the accompanying drawings.

(First Embodiment)

Figure 1:
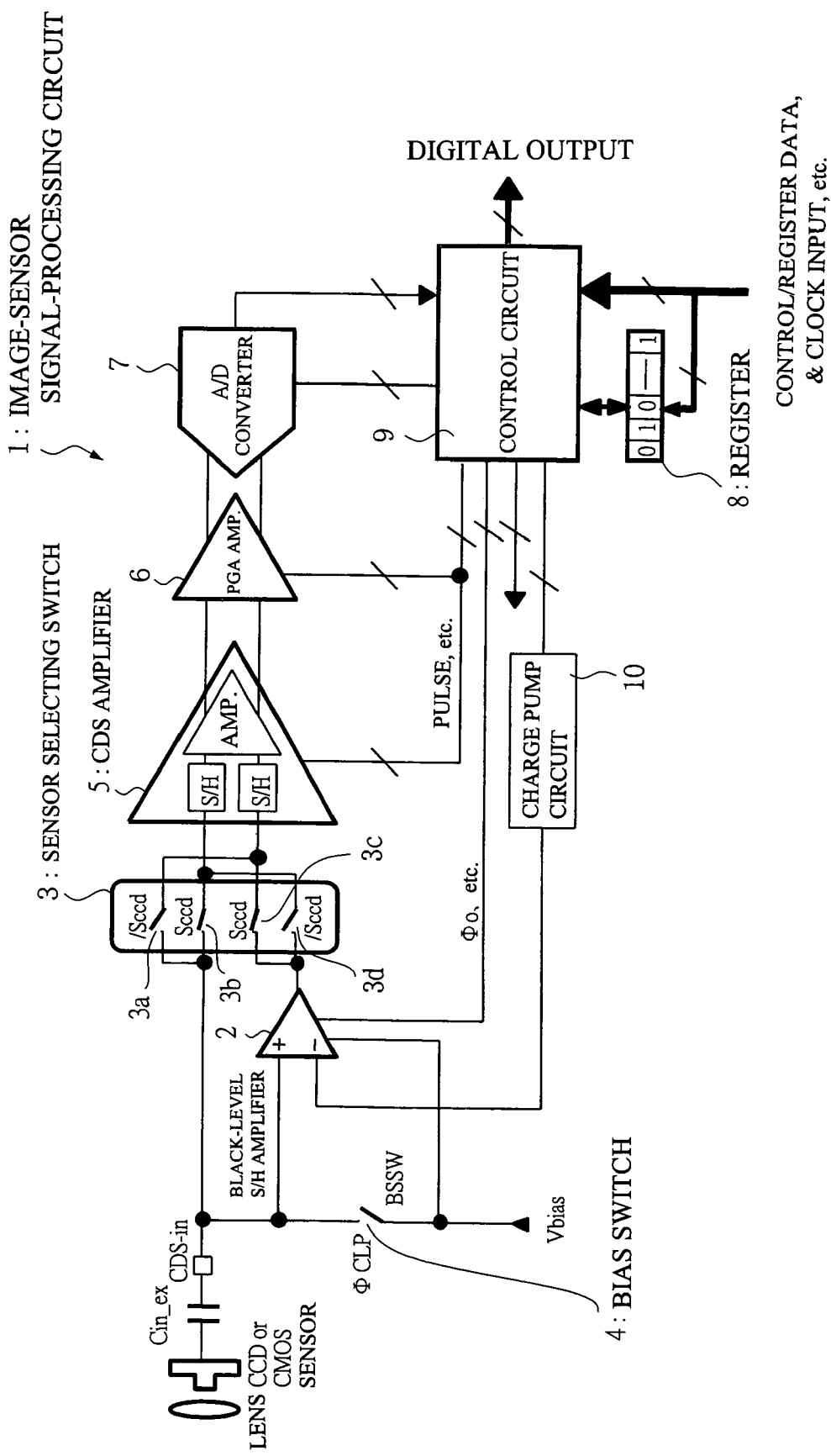
FIG. 1 is a block diagram showing an image-sensor signal-processing circuit according to a first embodiment of the present invention.
Figure 2:
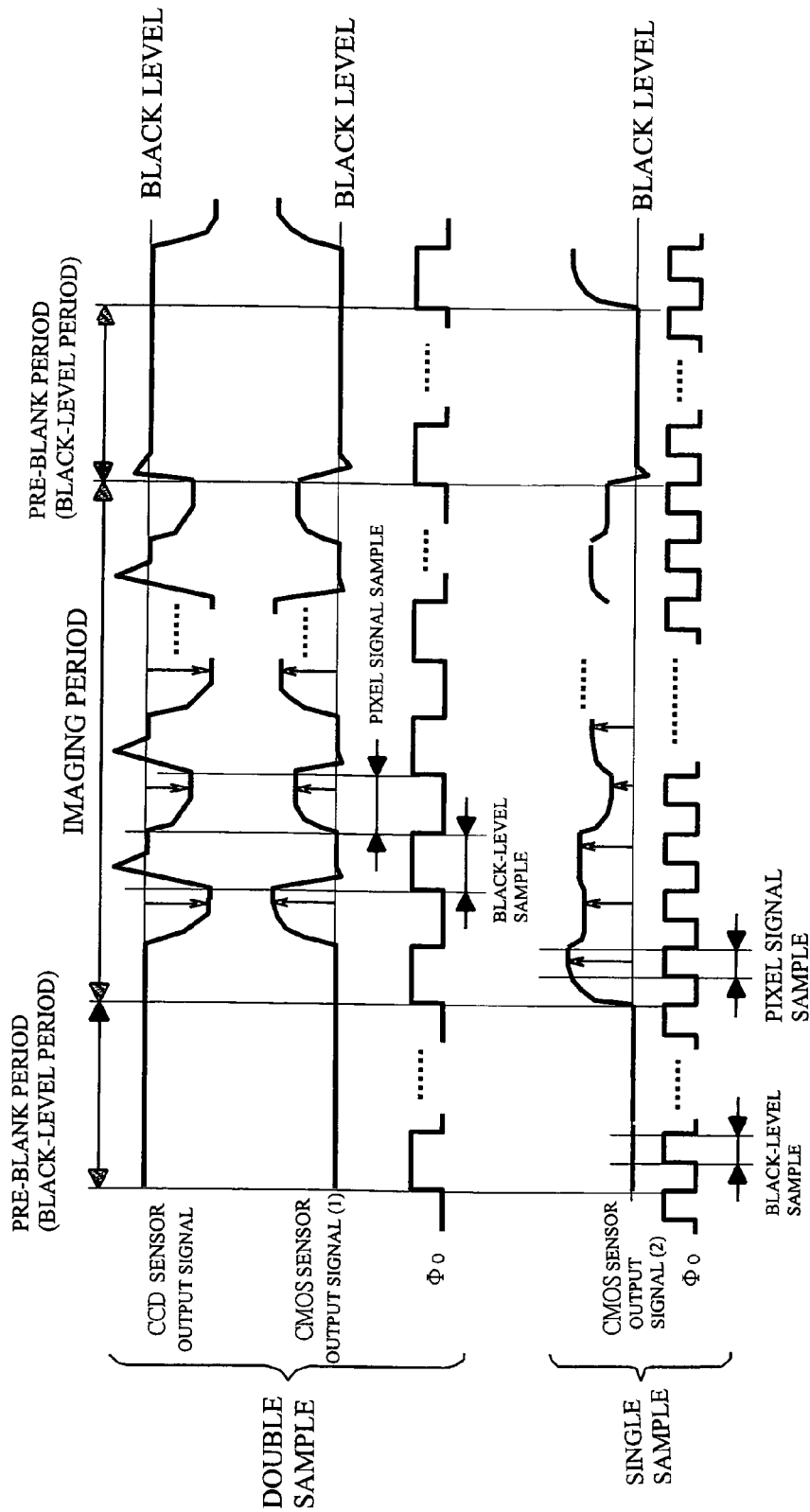
FIG. 2 is an explanatory diagram of signal-output waveforms of a CCD sensor and a CMOS sensor in the image-sensor signal-processing circuit in FIG. 1.
Figure 3:
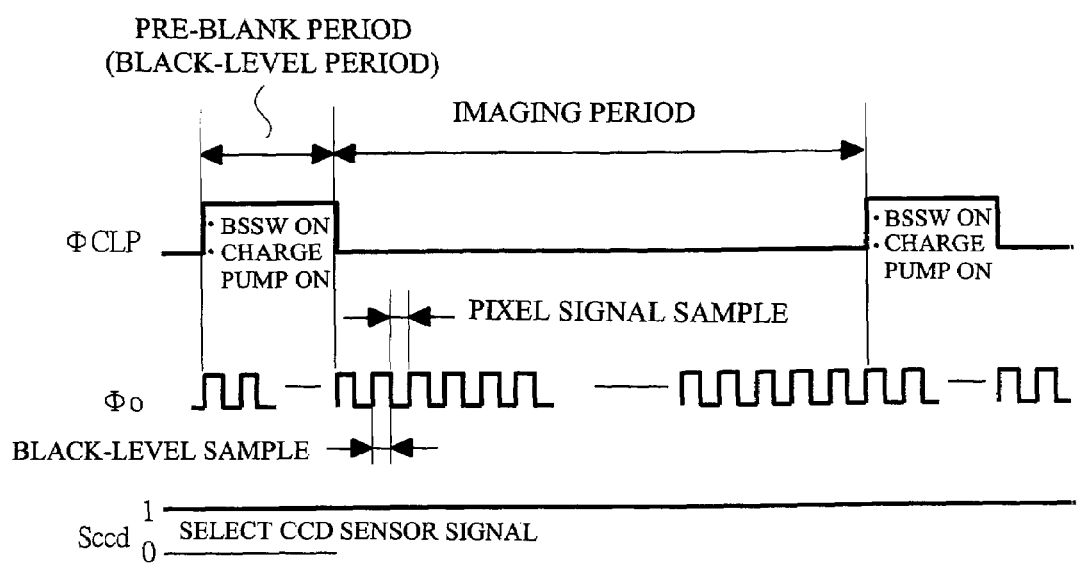
FIG. 3 is a timing chart at the time of selecting the CCD sensor in the image-sensor signal-processing circuit in FIG. 1.
Figure 4:
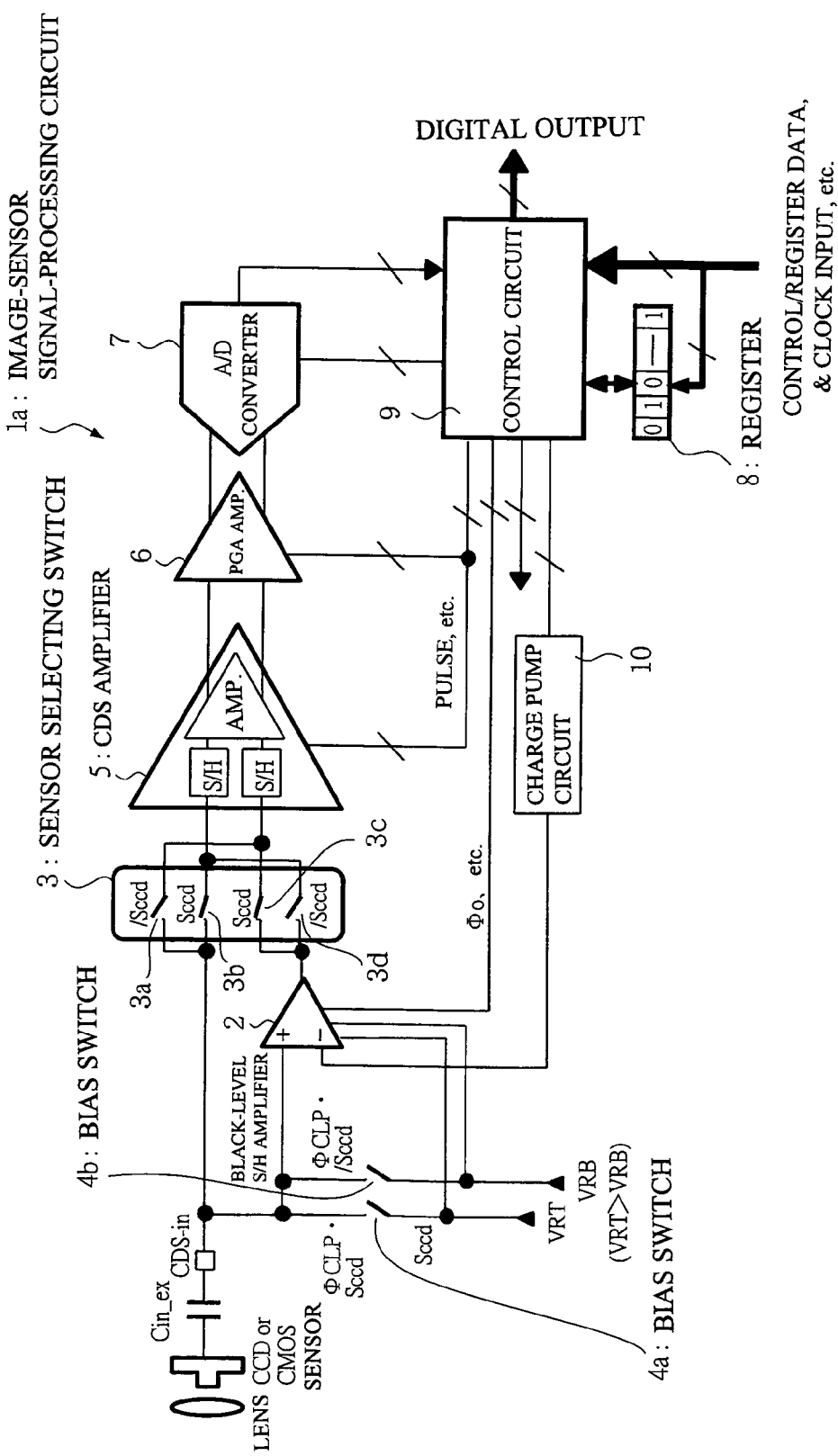
FIG. 4 is a block diagram showing another configuration example of the image-sensor signal-processing circuit in FIG. 1.
Figure 5:
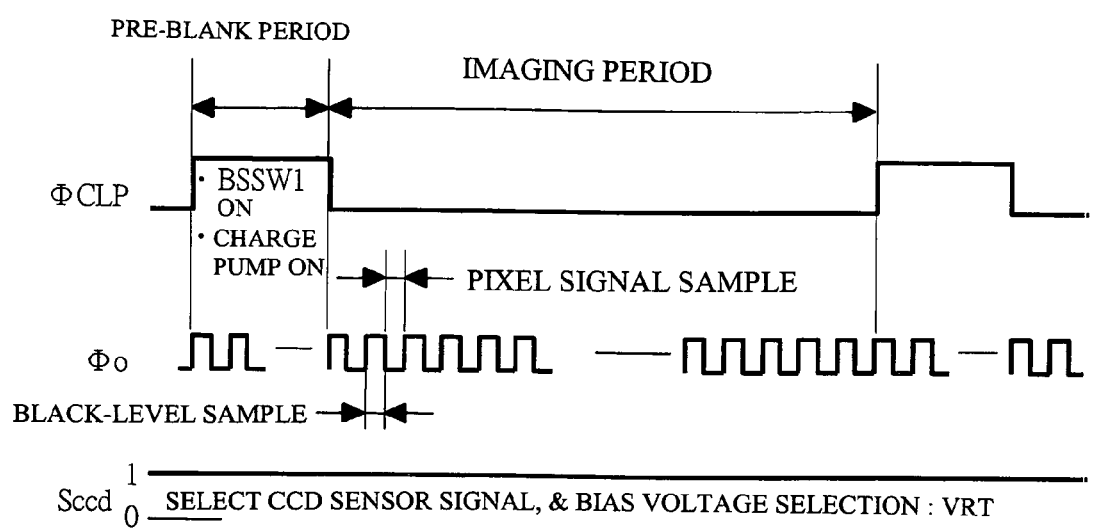
FIG. 5 is a timing chart at the time of selecting the CCD sensor in the image-sensor signal-processing circuit in FIG. 4.

FIG. 1 is a block diagram showing an image-sensor signal-processing circuit according to a first embodiment of the present invention; FIG. 2 is an explanatory diagram of signal-output waveforms of a CCD sensor and a CMOS sensor in the image-sensor signal-processing circuit in FIG. 1; FIG. 3 is a timing chart at the time of selecting the CCD sensor in the image-sensor signal-processing circuit in FIG. 1; FIG. 4 is a block diagram showing another configuration example of the image-sensor signal-processing circuit in FIG. 1; and FIG. 5 is a timing chart at the time of selecting the CCD sensor in the image-sensor signal-processing circuit in FIG. 4.

In this first embodiment, an image-sensor signal-processing circuit 1 provided in a semiconductor integrated circuit device comprises, as shown in FIG. 1, a black-level sample/hold (S/H) amplifier 2, a sensor selecting switch (sensor selecting section) 3, a bias switch (first bias switch) 4, a CDS amplifier (first amplifier) 5, a PGA (programmable gain amplifier) amplifier (second amplifier) 6, an A/D converter 7, a register (sensor selecting register) 8, a control circuit 9, and a charge pump circuit 10.

Images taken through a lens are inputted as sensor signals from an image sensor (CMOS sensor or CCD sensor) to a terminal CDS-in via an external capacitor Cin_ex.

A positive (+) side input of the black-level S/H amplifier 2, one input of the sensor selecting switch 3, and one connection of the bias switch 4 are connected to the terminal CDS-in.

The other connection of the bias switch 4 and the black-level S/H amplifier 2 are connected so that a bias voltage Vbias is inputted to them. The control terminal of the bias switch 4 is connected so that a control signal outputted from the control circuit 9 is inputted to it, and the bias switch 4 is turned on (conducting) when the control signal becomes a Hi signal.

An output of the charge pump circuit 10 is connected to a negative (−) side input of the black level S/H amplifier 2, and the other input of the sensor selecting switch 3 is connected to the output of the black-level S/H amplifier 2.

The sensor selecting switch 3 comprises switches 3a to 3d. The switches 3a to 3d are connected so that one connections of the switches 3a and 3b become one input of the sensor selecting switch 3 and one connections of the switches 3c and 3d becomes the other input of the sensor selecting switch 3.

One input of the CDS amplifier 5 is connected to the other connections of the switches 3b and 3d, and the other input of the CDS amplifier 5 is connected to the other connections of the switches 3a and 3c.

The control terminals of the switches 3a to 3d are connected so that a control signal outputted from the control circuit 9 is inputted to them, and the switches 3a to 3d are turned on or off state depending on the control signal. The switches 3a and 3d are turned on when the control signal is a "Lo" signal, and the switches 3b and 3c are turned on when the control signal is a "Hi" signal.

In this sensor selecting switch 3, the switches 3a and 3d are turned on when the CMOS sensor (first image sensor) is connected as an image sensor, and the switches 3b and 3c are turned on when the CCD sensor (second image sensor) is connected as an image sensor.

The black-level S/H amplifier 2 samples and holds a black-level signal in the sensor output of the image sensor. In order to selectively cope with the CCD sensor and the CMOS sensor, the sensor selecting switch 3 selects the pixel signal and the black-level signal of the black-level S/H amplifier output which are two inputs of the CDS amplifier 5 depending on the CCD/CMOS sensor, and outputs the selected signal.

The CDS amplifier 5 samples and holds the black-level signal and the pixel signal outputted from the black-level S/H amplifier 2, and amplifies the signals with a predetermined gain. The charge pump circuit 10 adds a desirable offset to the black-level S/H amplifier 2 in order to preset a digital value of the black-level signal to a predetermined value.

An input of the PGA amplifier 6 is connected to the output of the CDS amplifier 5, and an input of the A/D converter 7 is connected to the output of the PGA amplifier 6. The control circuit 9 is connected to the output of the A/D converter 7.

Additionally, the black-level S/H amplifier 2, the CDS amplifier 5, the charge pump circuit 10, and the register 8 are connected to the control circuit 9.

The PGA amplifier 6 further amplifies the output of the CDS amplifier 5 with a predetermined gain. The A/D converter 7 converts the output signal of the PGA amplifier 6 to a digital signal. In the control circuit 9, analog/digital conversion values are digital-signal-processed and clocks and various control signals are generated.

The register 8 sets and retains, from the outside, gains of the signal processing circuit and setting data of various operating conditions. The sensor selection data Sccd is set as one piece of operating condition setting data in this register 8.

The sensor selection data Sccd is data for selecting the CCD sensor or the CMOS sensor. For example, when the symbol '1' ("Hi" signal) is set to the register 8, the CCD sensor is selected and the control circuit 9 outputs the control signal of the "Hi" signal to the sensor selecting switch 3.

When the symbol '0' ("Lo" signal) is set to the register 8, the CMOS sensor is selected and the control circuit 9 outputs the control signal of the "Lo" signal to the sensor selecting switch 3.

Next, an operation of the image-sensor signal-processing circuit 1 according to the first embodiment will be described.

First, signal-output waveforms of the CCD sensor and the two types of CMOS sensors will be described with reference to the explanatory diagram of the signal-output waveforms in FIG. 2.

As shown in FIG. 2, a large difference between the CCD sensor and the CMOS sensor is that the respective waveforms of the black-level signal and the pixel signal from one sensor are reverse to those from the other sensor. More specifically, the pixel signal is smaller than the black level signal in the CCD sensor, and the pixel signal is higher than the black level signal in the CMOS sensor. Both of the CCD sensor and the CMOS sensor output the black-level signals during a pre-blank period and output the pixel signals during an imaging period.

Furthermore, the black level and the pixel signal are alternately outputted during the imaging period, and there is a signal required for the double sampling in order to detect waveform size of the pixel signal from the black level. In the CMOS sensor, there is a signal outputting the black level only during the pre-blank period and the pixel signal is continuously outputted during the imaging period.

FIG. 3 is a timing chart of the image-sensor signal-processing circuit 1 at the time of selecting the CCD sensor.

In FIG. 3, there are shown, in this order, respective signal timings of a sampling clock signal ΦCLP and a sampling clock signal Φ0 outputted from the control circuit 9, and of the sensor selection data Sccd set to the register 8. The sampling clock signal ΦCLP is a sampling clock to be the "Hi" signal at each pre-blank period. The sampling clock signal Φ0 is a sampling clock for the black level and the pixel signal.

First, when the CCD sensor is selected as an image sensor, the data showing that the CCD sensor is provided is stored in the register 8. The control circuit 9 controls the sensor selecting switch 3 so as to turn on the switches 3b and 3c based on the data stored in the register 8.

Therefore, the output signal of the CCD sensor is inputted to one input of the CDS amplifier 5, and the output signal of the black-level S/H amplifier 2 is inputted to the other input of the CDS amplifier 5.

When the sampling clock signal ΦCLP becomes the "Hi" signal during the pre-blank period, the control signal of the "Hi" signal is outputted from the control circuit 9 and the bias switch 4 is turned on, and then the bias voltage Vbias and the black-level signal outputted from the CCD sensor are inputted to the black-level S/H amplifier 2.

The signal outputted from the black-level S/H amplifier 2 and the black-level signal outputted from the CCD sensor are converted to digital data by the A/D converter 7 via the CDS amplifier 5 and the PGA amplifier 6 and are outputted to the control circuit 9.

The control circuit 9 controls an operation of the charge pump circuit 10 based on the inputted digital data so as to apply the desirable offset to the black-level S/H amplifier 2, and presets the digital value of the black level signal to a desirable value.

Thereafter, during the imaging period, the sampling clock signal ΦCLP becomes the "Lo" signal and the bias switch 4 is turned off and the sampling of the pixel signal is done. Thereafter, the pre-blank period and the imaging period are repeated alternately.

Meanwhile, when the CMOS sensor is selected as an image sensor, the data showing that the CMOS sensor is provided is stored in the register 8. The control circuit 9 controls the switches 3a and 3d of the sensor selecting switch 3 so as to turn on them based on the data stored in the register 8.

In this case, the output signal of the CMOS sensor is inputted to the other input of the CDS amplifier 5, and the output signal of the black-level S/H amplifier 2 is inputted to one input of the CDS amplifier 5.

In this manner, even if the polarity of the output signals of the image sensors as shown in FIG. 2 is reversed, a normal signal is inputted to both inputs of the CDS amplifier 5. Therefore, it is possible to flexibly cope with any image sensor of the CCD sensor and the CMOS sensor.

Additionally, in the image-sensor signal-processing circuit 1, the terminal CDS-in for outputting the image sensor signal is biased to a predetermined voltage within an input operating range of the black-level S/H amplifier 2 and the CDS amplifier 5, and is varied in a similar fashion to an amplitude of the image sensor output.

Since the input operation range can be set wide when power supply voltage is high, the same bias voltage is available in both cases of the CCD sensor and the CMOS sensor. However, as the power supply voltage is low, the input operation range becomes narrower than the amplitude of the image sensor output and it becomes difficult to set the bias voltage used for the CCD sensor and the CMOS sensor in common.

FIG. 4 is a block diagram showing the circuit configuration of the image-sensor signal-processing circuit 1a capable of coping with the bias voltage of an input terminal CDS-in of the image sensor by selecting the bias voltage in accordance with the image sensor (CCD sensor or CMOS sensor) also at the time of the low power supply voltage.

In this case, a configuration of an image-sensor signal-processing circuit 1a is obtained by newly adding bias switches (first bias switch) 4a and 4b to the configuration of the image sensor signal processing circuit 1 shown in FIG. 1, which comprises the black-level S/H amplifier 2, the sensor selecting switch 3, the CDS amplifier 5, the PGA amplifier 6, the A/D converter 7, the register 8, the control circuit 9, and the charge pump circuit 10.

The positive (+) side input of the black-level S/H amplifier 2 is connected to each one connection of the bias switches 4a and 4b. Also, a bias voltage (first bias voltage) VRT and a bias voltage (second bias voltage) VRB are supplied to the other connections of the bias switches 4a and 4b, respectively.

Similarly to the switches 3a to 3d, control signals outputted from the control circuit 9 are inputted to control terminals of the bias switches 4a and 4b.

FIG. 5 is a timing chart of the image-sensor signal-processing circuit 1a at the time of selecting the CCD sensor.

In FIG. 5, there are shown, in this order, signal timings of a sampling clock signal ΦCLP and a sampling clock signal Φ0 outputted from the control circuit 9, and of sensor selection data Sccd set to the register 8.

When the CCD sensor is selected as an image sensor, the symbol '1' is stored as one piece of sensor selection data Sccd in the register 8. The control circuit 9 controls the switches 3b and 3c of the sensor selecting switch 3 so as to turn on them based on the data.

In the pre-blank period, the control circuit 9 turns on the bias switch 4a while the sampling clock signal ΦCLP is the "Hi" signal and the sensor selection data Sccd is the symbol '1', and then supplies the bias voltage VRT to the positive (+) side input of the black-level S/H amplifier 2.

Also, the sensor selection data Sccd in the register 8 is the symbol '0' when the CMOS sensor is selected. Therefore, in the pre-blank period, the control circuit 9 turns on the bias switch 4b while the sampling clock signal ΦCLP is the "Hi" signal and the sensor selection data Sccd is the symbol '0', and then supplies the bias voltage VRB to the positive (+) side input of the black-level S/H amplifier 2.

Note that the bias voltages VRT and VRB to be selected satisfy the relation "bias voltage VRT>bias voltage VRB".

Due to this, in the first embodiment, it is easily possible to flexibly cope with both image sensors of the CCD sensor and the CMOS sensor by using the simple circuit configuration without applying any new external circuits to the image-sensor signal-processing circuits 1 and 1a.

(Second Embodiment)

Figure 6:
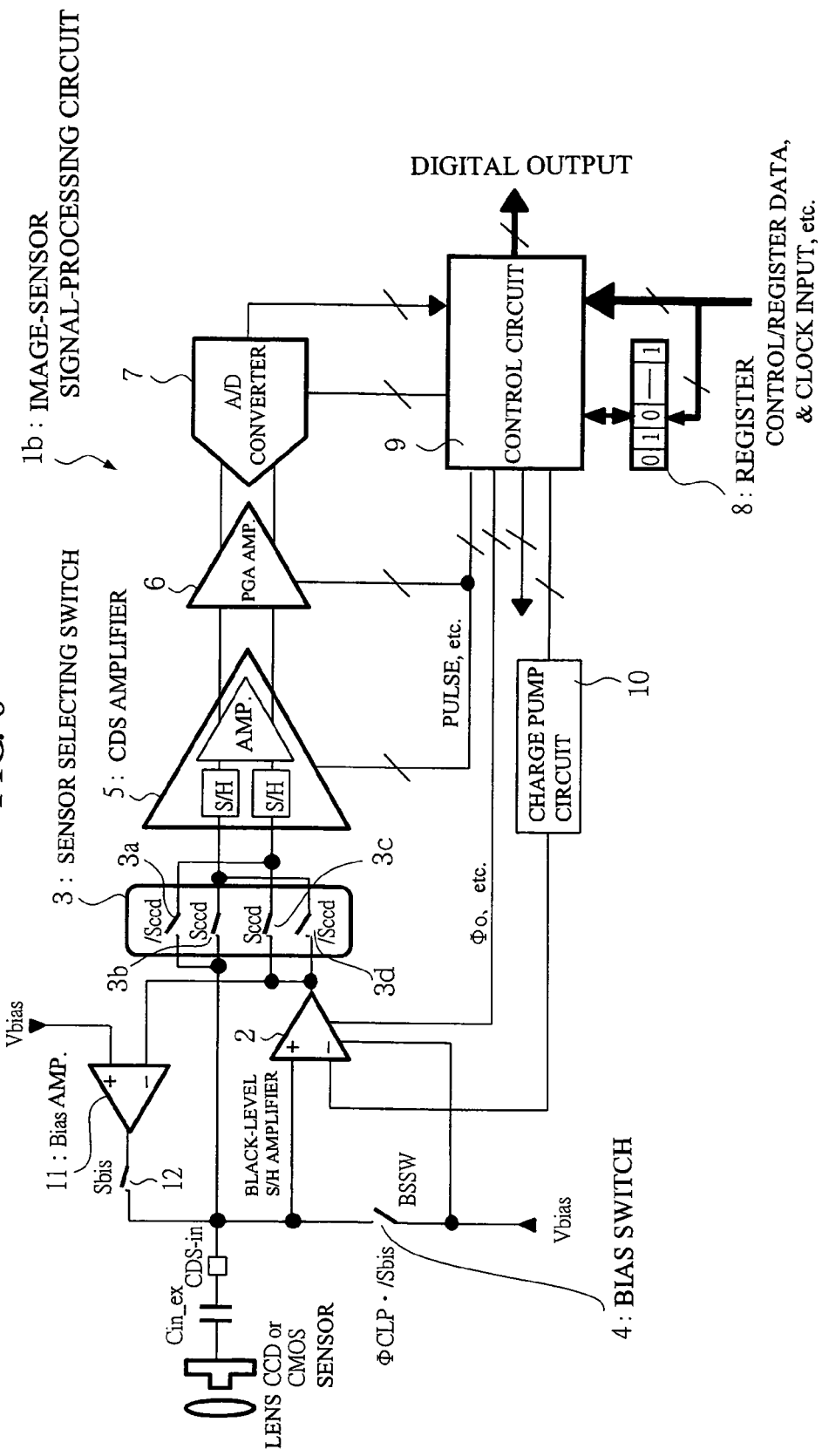
FIG. 6 is a block diagram showing an image-sensor signal-processing circuit according to a second embodiment of the present invention.
Figure 7:
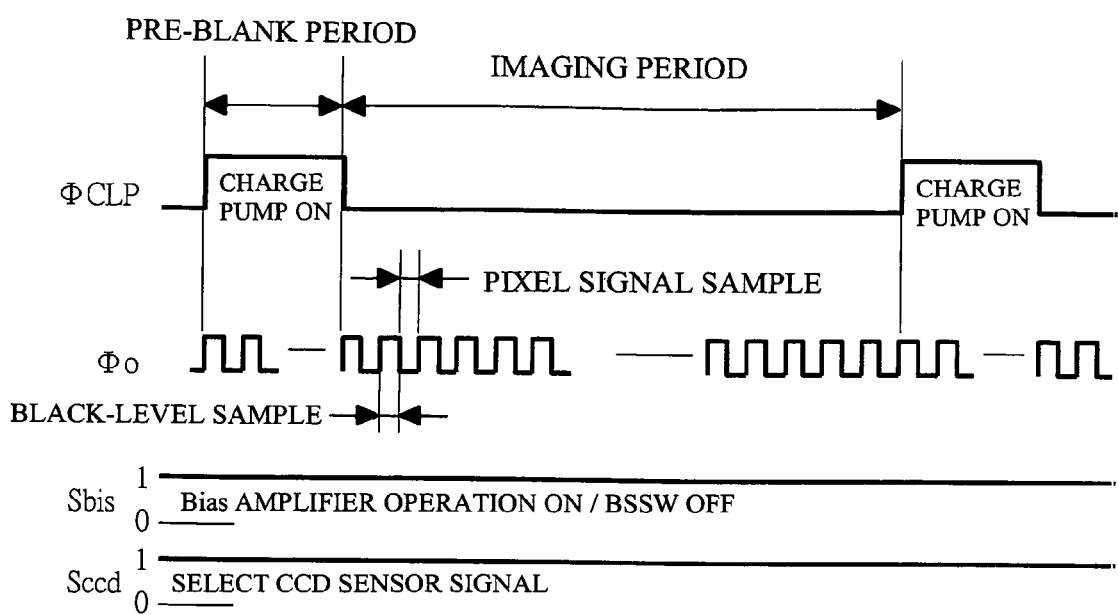
FIG. 7 is a timing chart at the time of selecting the CCD sensor in the image-sensor signal-processing circuit in FIG. 6.

FIG. 6 is a block diagram showing an image-sensor signal-processing circuit according to a second embodiment of the present invention and FIG. 7 is a timing chart at the time of selecting the CCD sensor in the image-sensor signal-processing circuit in FIG. 6.

According to a second embodiment, the image-sensor signal-processing circuit 1b is, as shown in FIG. 6, one in which a bias voltage almost equal to the bias voltage Vbias is applied to the terminal CDS-in by the bias amplifier 11 when the output signal of the image sensor is inputted via the capacitor Cin_ex.

An image-sensor signal-processing circuit 1b is obtained by newly adding a bias amplifier 11 and a bias switch (second bias switch) 12 to the configuration comprising the black-level S/H amplifier 2, the sensor selecting switch 3, the bias switch 4, the CDS amplifier 5, the PGA amplifier 6, the A/D converter 7, the register 8, the control circuit 9, and the charge pump circuit 10 similarly to the image-sensor signal-processing circuit 1 (FIG. 1).

The control signals outputted from the control circuit 9 are inputted to respective control terminals of the bias switches 4 and 12. Also, bias selection data Sbis for selecting a bias method is stored as one new piece of data in the register 8.

The bias voltage Vbias is inputted to the positive (+) side input of the bias amplifier 11, and the output of the black-level S/H amplifier 2 and one connection of the switch 3c are connected to the negative (−) side input of the bias amplifier 11.

One connection of the bias switch 12 is connected to the output of the bias amplifier 11, and the terminal CDS-in is connected to the other connection of the bias switch 12.

FIG. 7 is a timing chart of the image sensor signal processing circuit 1b at the time of selecting the CCD sensor. In FIG. 7, there are shown, in this order, the signal timings of the sampling clock signal ΦCLP and the sampling clock signal Φ0 outputted from the control circuit 9, and of the bias selection data Sbis and the sensor selection data Sccd stored in the register 8.

As shown in FIG. 7, when the sampling clock signal ΦCLP is the "Hi" signal and the bias selection data Sbis is the symbol '0' during the pre-blank period, the control circuit 9 outputs a control signal to turn on the bias switch 4, whereby the bias voltage Vbias shown in FIG. 1 is applied.

Also, when the bias selection data Sbias is the symbol '1', the control circuit 9 is controlled so that the bias switch 4 is turned off and the bias switch 12 is turned on. Therefore, the bias voltage outputted from the bias amplifier 11 is applied.

In the biasing by using this bias amplifier 11, the generated bias voltage functions to bias the terminal CDS-in so that the output of the black-level S/H amplifier 2 is made equal to the bias voltage Vbias.

By so doing, even if the offset voltage is applied to the black-level S/H amplifier 2 by the charge pump circuit 10, the output of the black-level S/H amplifier 2 is adjusted to a predetermined voltage and, therefore, it is possible to keep input operation points of the CDS amplifier 5 uniform.

Additionally, it is also possible to reduce variation of the bias voltage of the terminal CDS-in due to a charge/discharge current to/from the capacitor Cin_ex generated by repeatedly sampling sensor signals by the CDS amplifier 5.

For this reason, also in the second embodiment, it is easily possible to flexibly cope with both image sensors of the CCD sensor and the CMOS sensor by using the simple circuit configuration without adding any new external circuits to the image-sensor signal-processing circuit 1b.

(Third Embodiment)

Figure 8:
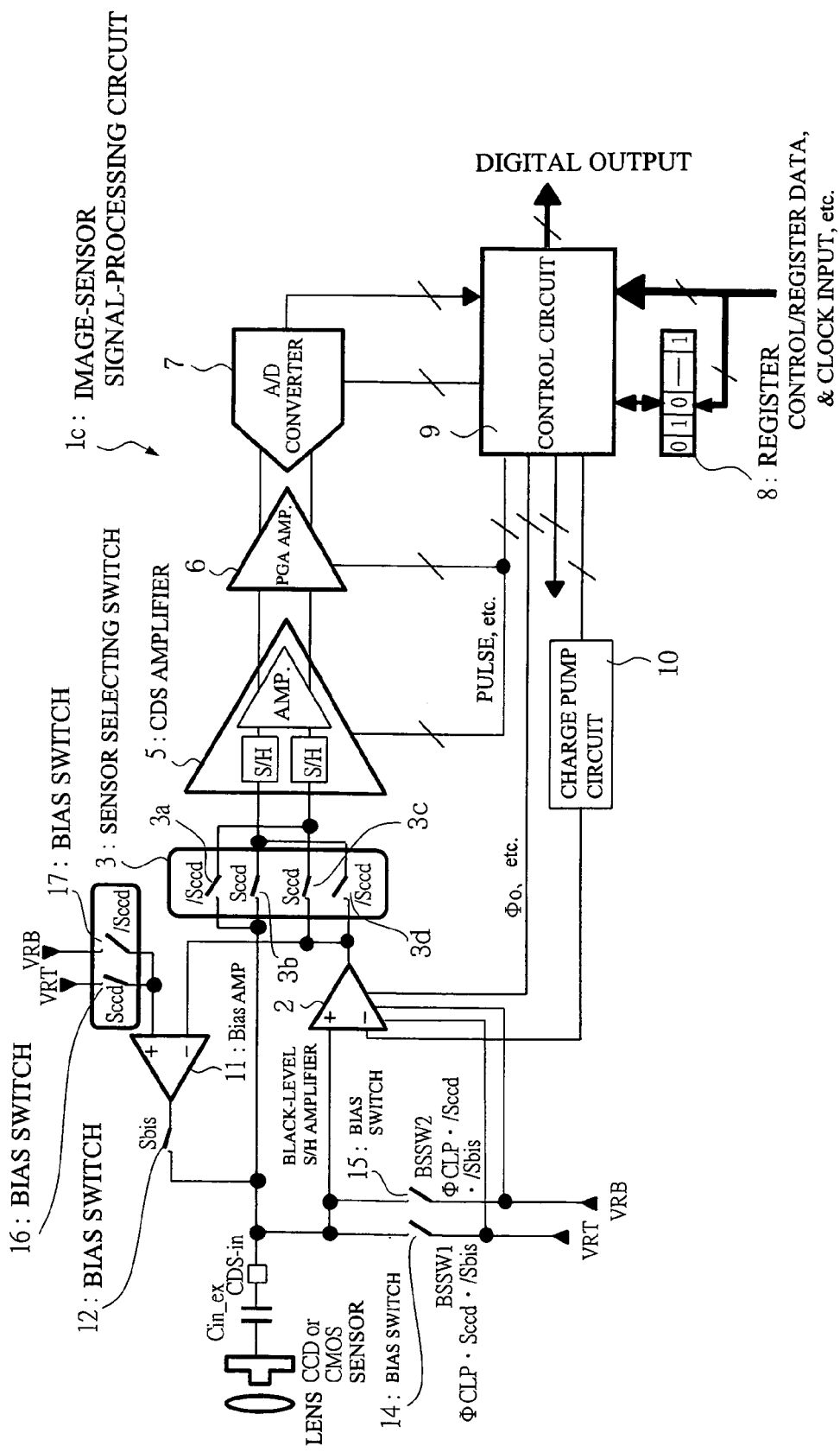
FIG. 8 is a block diagram showing an image-sensor signal-processing circuit according to a third embodiment of the present invention.
Figure 9:
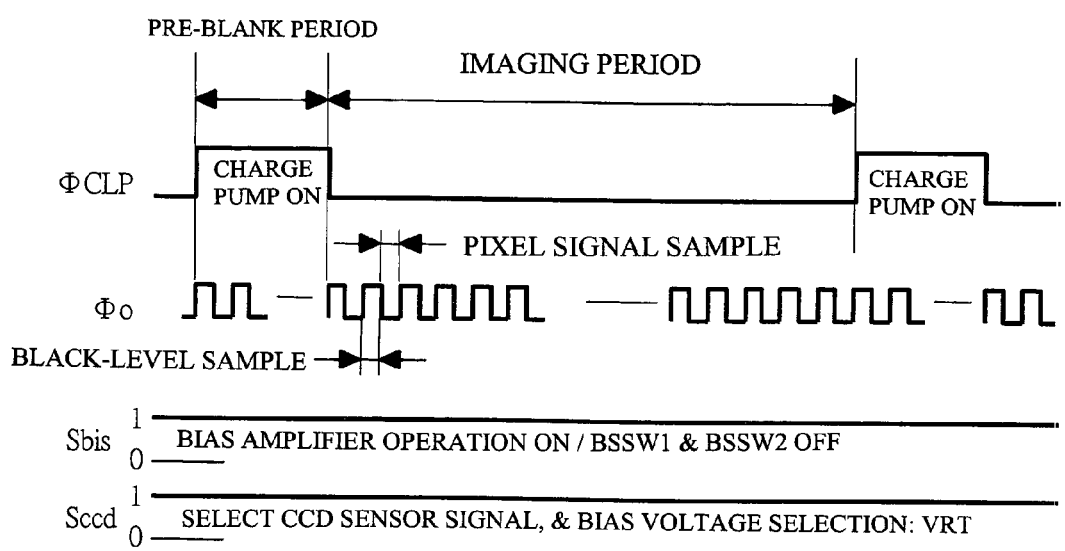
FIG. 9 is a timing chart at the time of selecting the CCD sensor in the image-sensor signal-processing circuit in FIG. 8.

FIG. 8 is a block diagram showing an image-sensor signal-processing circuit according to a third embodiment of the present invention, and FIG. 9 is a timing chart at the time of selecting the CCD sensor in the image-sensor signal-processing circuit in FIG. 8.

In a third embodiment, an image-sensor signal-processing circuit 1c can select the output voltage of the black-level S/H amplifier 2 depending on the image sensor (CCD sensor or CMOS sensor) in the case of the biasing by the use of the bias amplifier 11 shown in FIG. 6.

The image-sensor signal-processing circuit 1c is obtained by newly adding bias switches 14 to 17 to the configuration comprising the black-level S/H amplifier 2, the sensor selecting switch 3, the CDS amplifier 5, the PGA amplifier 6, the A/D converter 7, the register 8, the control circuit 9, the charge pump circuit 10, the bias amplifier 11, and the bias switch 12 as shown in the image-sensor signal-processing circuit 1b of FIG. 6.

Respective control terminals of the bias-switches 14 to 17 are connected so that the control signal outputted from the control circuit 9 is inputted to them. The bias voltage VRT is supplied to one connection of the bias switch 14, and the positive (+) side input of the black-level S/H amplifier 2 and the terminal CDS-in are connected to the other connection of the bias switch 14.

The bias voltage VRB is supplied to one connection of the bias switch 15, and the positive (+) side input of the black level S/H amplifier 2 is connected to the other connection of the bias switch 15.

The bias voltage VRT is supplied to one connection of the bias switch 16, and the bias voltage VRB is supplied to one connection of the bias switch 17. The positive (+) side input of the bias amplifier 11 is connected to the other connections of these bias switches 16 and 17.

FIG. 9 is a timing chart of the image-sensor signal-processing circuit 1c at the time of selecting the CCD sensor. In FIG. 9, there are shown, in this order, the signal timings of the sampling clock signal ΦCLP and the sampling clock signal Φ0 outputted from the control circuit 9, and of the bias selection data Sbis and the sensor selection data Sccd stored in the register 8.

As shown, when the sampling clock signal ΦCLP is the "Hi" signal and the sensor selection data Sccd is the "Hi" signal and the bias selection data Sbis is the symbol '1', the control circuit 9 turns off the bias switches 14 and 15 and turns on the bias switch 16 and sets, to the bias voltage VRT, the input bias of the positive (+) side input of the bias amplifier 11.

Meanwhile, when the sensor selection data Sccd stored in the register 8 is the symbol '0', the control circuit 9 is controlled so that the bias switch 17 is turned on, and then the bias voltage VRB is inputted to the positive (+) side input of the bias amplifier 11. In this manner, the operation under the condition of the low supply voltage can be achieved.

Due to this, in the third embodiment, it is easily possible to flexibly cope with both image sensors of the CCD sensor and the CMOS sensor by using the simple circuit configuration without adding any new external circuits to the image-sensor signal-processing circuit 1c.

Additionally, each configuration of the image-sensor signal-processing circuits as shown in FIGS. 1, 4, 6, and 8 may be provided with an input buffer.

Figure 10:
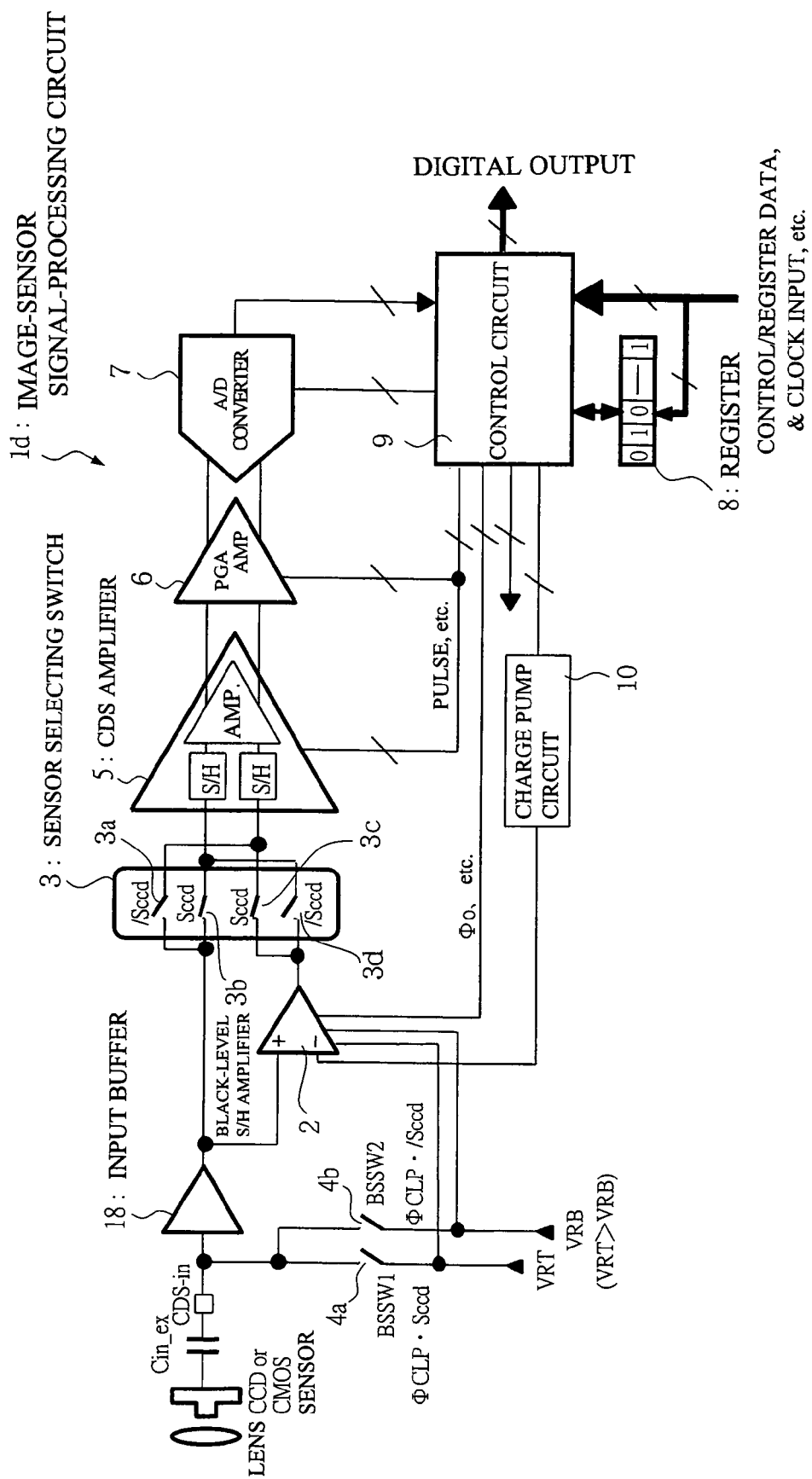
FIG. 10 is a block diagram showing a configuration in which an input buffer is provided in the image-sensor signal-processing circuit shown in FIGS. 1, 4, 6, and 8.

FIG. 10 shows a configuration example of an image-sensor signal-processing circuit 1d obtained by newly providing an input buffer 18 to the configuration of the image-sensor signal-processing circuit 1a shown in FIG. 4.

In this case, the terminal CDS-in is connected to the input of the input buffer 18, and the positive (+) side input of the black-level S/H amplifier 2 and each one connection of the switches 3a and 3b are connected to the output of the input buffer 18.

For this configuration, noises, caused by the transient charge/discharge current at the time when the black-level S/H amplifier 2 and the CDS amplifier 5 sample and hold the signals, can be prevented from leaking out into the terminal CDS-in.

Furthermore, each of the image-sensor signal-processing circuits as shown in FIGS. 1, 4, 6, 8, and 10 has a structure in which the CCD or CMOS sensor is selected in the input side of the CDS amplifier 5. However, the CCD or CMOS sensor may be selected in the output side of the CDS amplifier 5 as shown in FIGS. 11 to 14.

Figure 11:
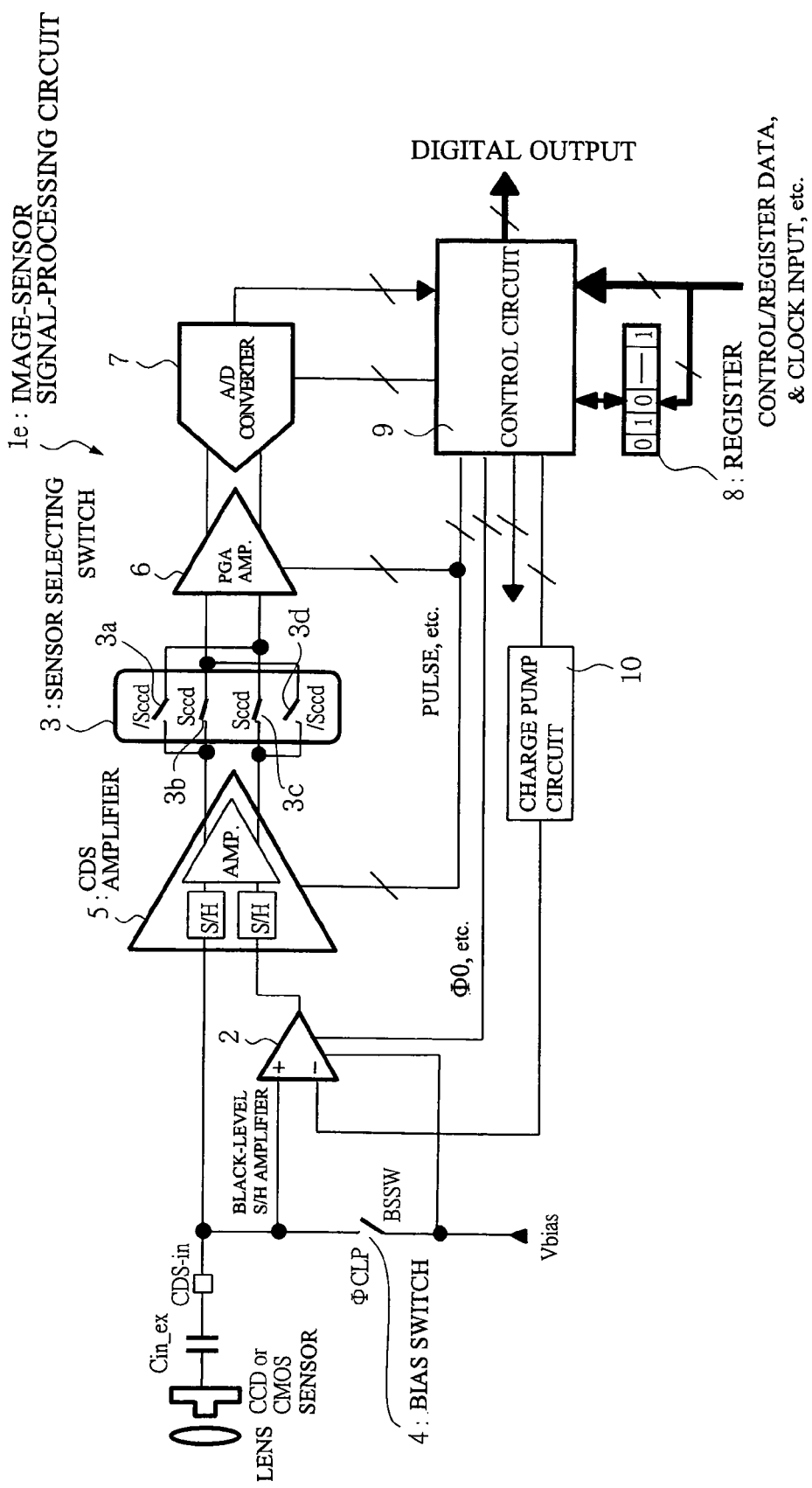
FIG. 11 is a block diagram showing an example of the image-sensor signal-processing circuit according to another embodiment of the present invention.

In an image-sensor signal-processing circuit 1e shown in FIG. 11, the sensor selecting switch 3 is provided to a latter stage of the CDS amplifier 5, and one output of the CDS amplifier 5 is connected to one connections of the switches 3a and 3b and the other output of the CDS amplifier is connected to one connections of the switches 3c and 3d.

One input of the PGA amplifier 6 is connected to the other connections of the switches 3a and 3c, and the other input of the PGA amplifier 6 is connected to the other connections of the switches 3b and 3d.

Additionally, the terminal CDS-in is connected to one input of the CDS amplifier 5, and the output of the black-level S/H amplifier 2 is connected to the other input of the CDS amplifier 5.

Figure 12:
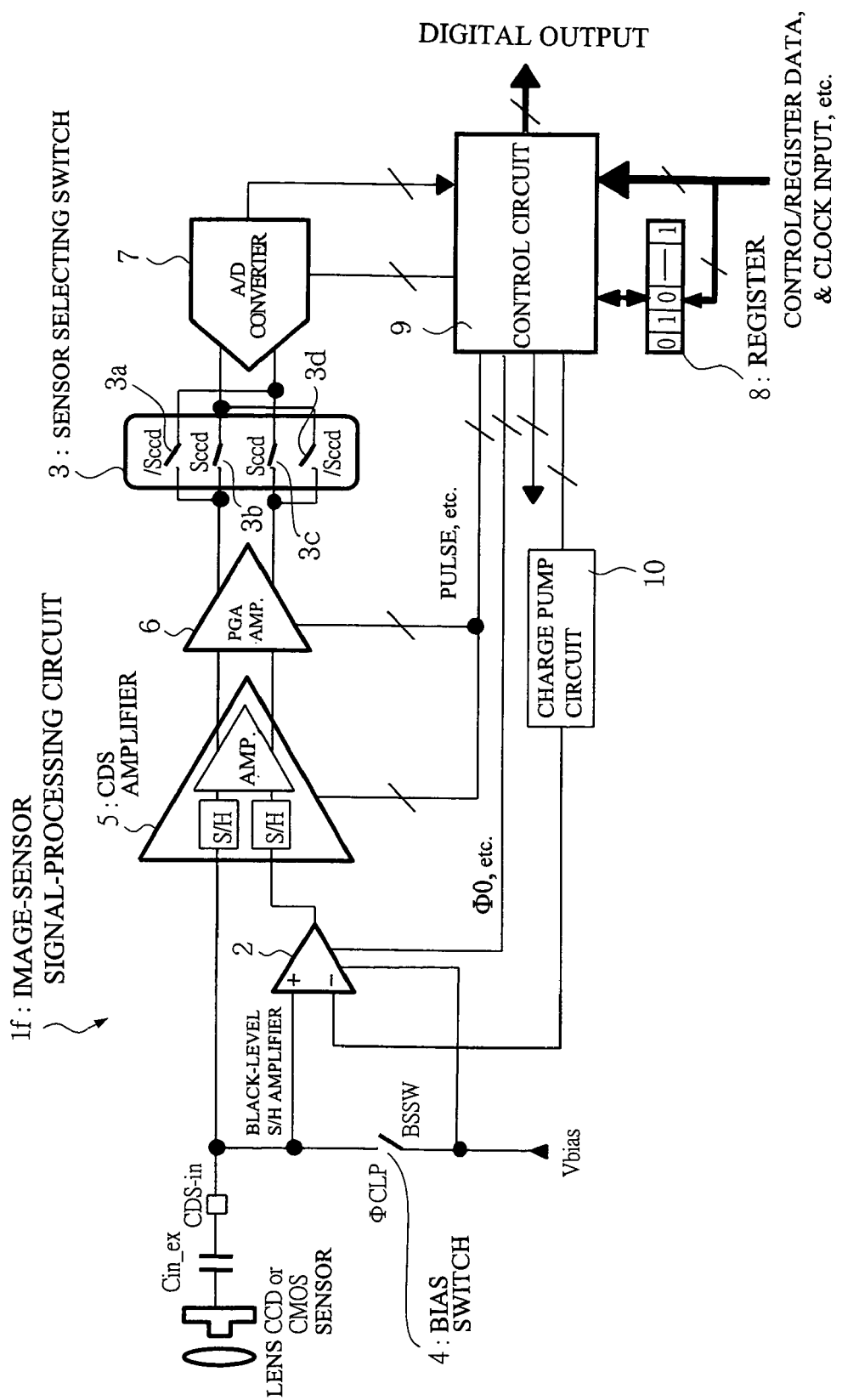
FIG. 12 is a block diagram showing another example of the image-sensor signal-processing circuit according to another embodiment of the present invention.

In an image-sensor signal-processing circuit 1f as shown in FIG. 12, the selection of the CCD sensor/CMOS sensor is controlled at a former stage of the A/D converter 7. In this case, one connections of the switches 3a and 3b are connected to one output of the PGA amplifier 6, and one connections of the switches 3c and 3d are connected to the other output of the PGA amplifier 6.

The other input of the A/D converter 7 is connected to the other connections of the switches 3a and 3c, and one input of the A/D converter 7 is connected to the other connections of the switches 3b and 3d.

Also in this case, the terminal CDS-in is connected to one input of the CDS amplifier 5, and the output of the black-level S/H amplifier 2 is connected to the other input of the CDS amplifier 5.

Figure 13:
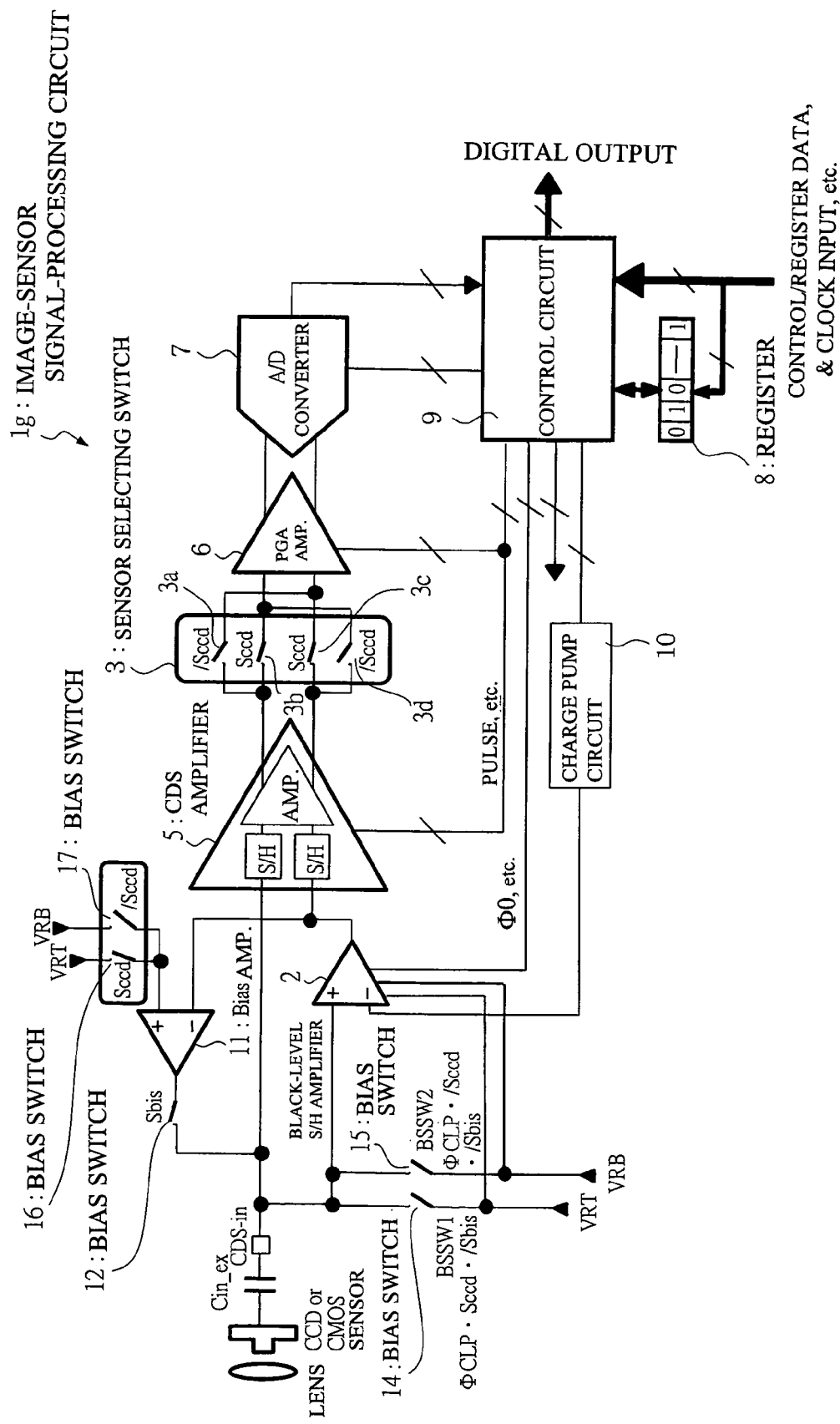
FIG. 13 is a block diagram showing an example of the image-sensor signal-processing circuit according to another embodiment of the present invention.

Furthermore, in an image-sensor signal-processing circuit 1g shown in FIG. 13, the sensor selecting switch 3 is provided on an output side of the CDS amplifier 5 in the case of using the bias amplifier as the means of biasing the terminal CDS-in shown in FIG. 8. Also, in an image-sensor signal-processing circuit 1h shown in FIG. 14, the sensor selecting switch 3 as shown in FIG. 13 is provided at a former stage of the A/D converter 7.

In the image-sensor signal-processing circuit 1g, one output of the CDS amplifier 5 is connected to one connections of the switches 3a and 3b, and the other output of the CDS amplifier 5 is connected to the other connections of the switches 3c and 3d.

One input of the PGA amplifier 6 is connected to the other connections of the switches 3a and 3c, and the other input of the PGA amplifier 6 is connected to the other connections of the switches 3b and 3d.

Also in FIG. 13, the terminal CDS-in is connected to one input of the CDS amplifier 5, and the output of the black-level S/H amplifier 2 is connected to the other input of the CDS amplifier 5.

Figure 14:
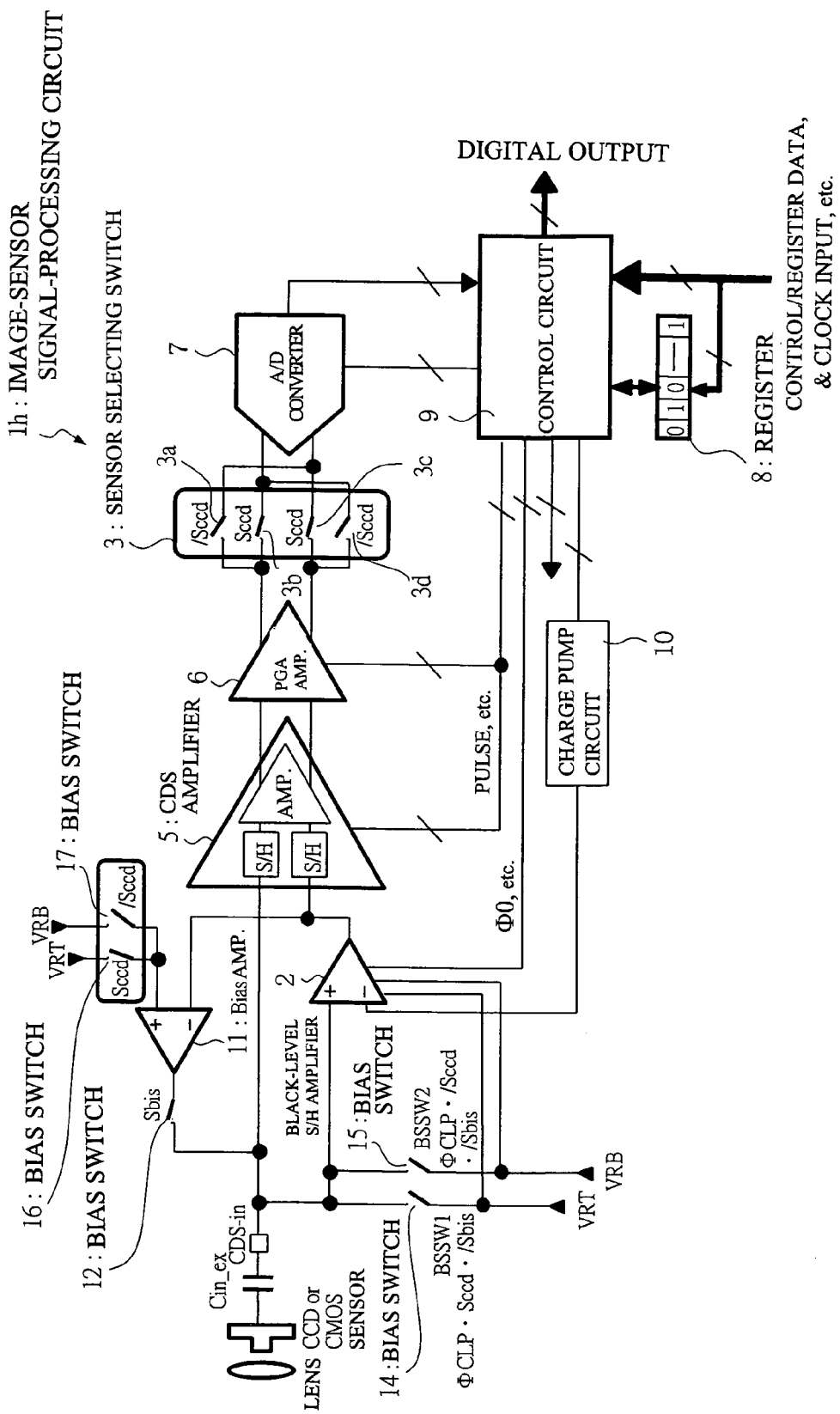
FIG. 14 is a block diagram showing another example of the image-sensor signal-processing circuit according to another embodiment of the present invention.

Additionally, in the image-sensor signal-processing circuit 1h shown in FIG. 14, one connections of the switches 3a and 3b are connected to one output of the PGA amplifier 6, and one connections of the switches 3c and 3d are connected to the other output of the PGA amplifier 6.

The other input of the A/D converter 7 is connected to the other connections of the switches 3a and 3c, and one input of the A/D converter 7 is connected to the other connections of the switches 3b and 3d.

Also in this case, the terminal CDS-in is connected to one input of the CDS amplifier 5, and the output of the black-level S/H amplifier 2 is connected to the other input of the CDS amplifier 5.

(Fourth Embodiment)

Figure 15:
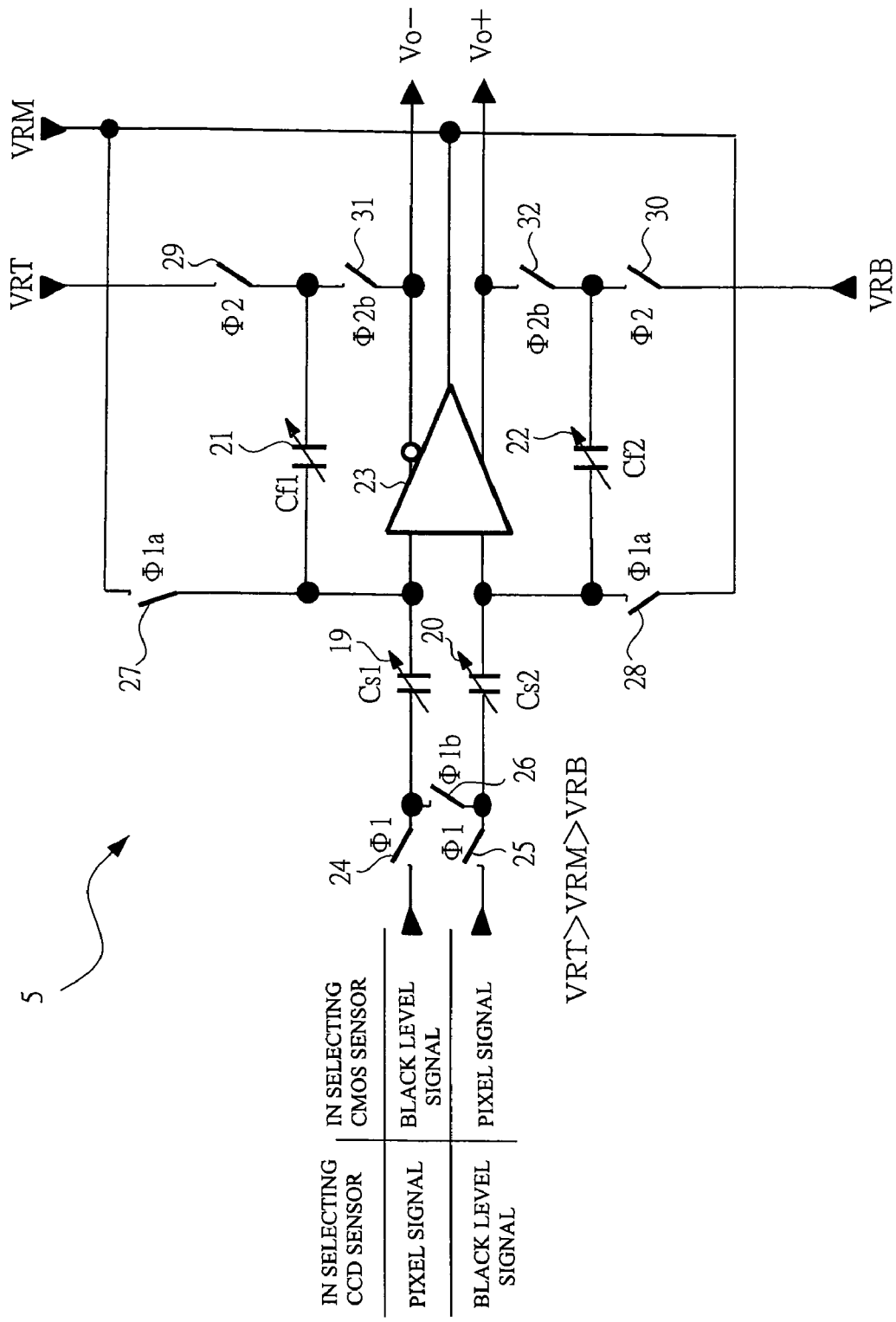
FIG. 15 is an explanatory diagram showing an example of a CDS amplifier provided in an image-sensor signal-processing circuit according to a fourth embodiment of the present invention.
Figure 16:
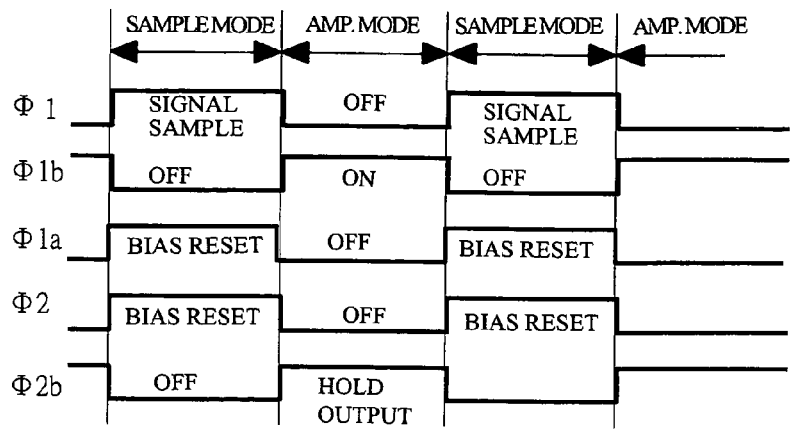
FIG. 16 is a timing chart showing operation timing in switches provided in a CDS amplifier shown in FIG. 15.
Figure 17:
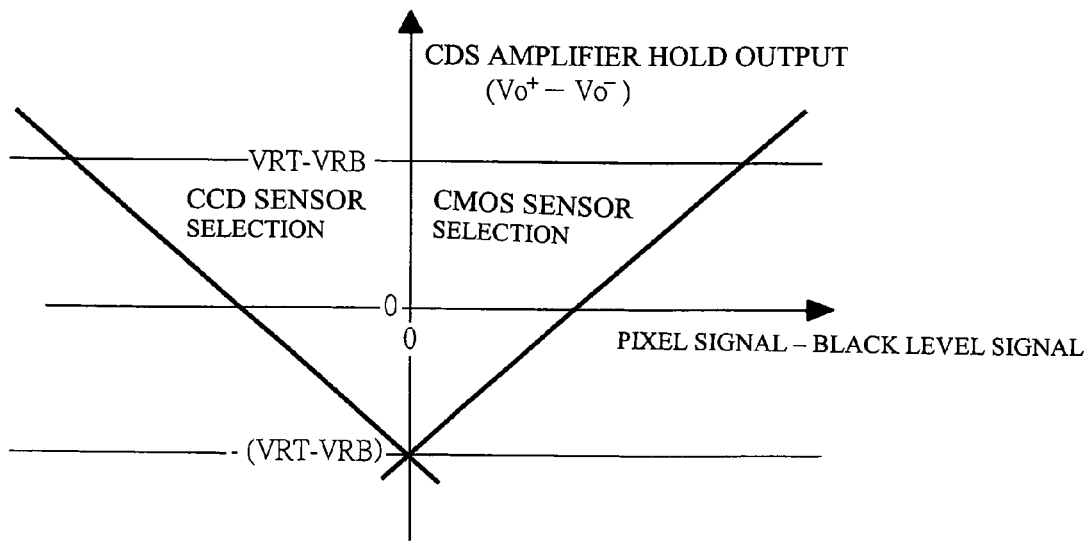
FIG. 17 is an explanatory diagram showing input/output characteristics of the CDS amplifier shown in FIG. 15.

FIG. 15 is an explanatory diagram showing an example of a CDS amplifier provided in an image-sensor signal-processing circuit according to a fourth embodiment of the present invention; FIG. 16 is a timing chart of an operation timing in the switches provided to the CDS amplifier shown in FIG. 15; and FIG. 17 is an explanatory diagram showing input/output characteristics of the CDS amplifier shown in FIG. 15.

In a fourth embodiment, the CDS amplifier 5 is a switched capacitor amplifier, and comprises capacitors 19 to 22, an amplifier 23, and switches 24 to 32 as shown in FIG. 15. One connections of the switches 24 and 25 are connected so that the sensor signals outputted from the image sensor and the black-level S/H amplifier 2 are inputted to them.

One connections of the capacitors 19 and 20 and a connection of the switch 26 are connected to the other connections of the switches 24 and 25. One connections of the capacitors 19 and 20 are connected to one connections of the switches 27 and 28, respectively.

The other connections of the switches 27 and 28 are connected so that the bias voltage VRM is inputted to them. The other connection of the switch 29 and one connection of the switch 31 is connected to the other connection of the capacitor 21, and the other connection of the switch 32 and one connection of the switch 30 are connected to the other connection of the capacitor 22.

One connection of the switch 29 is connected so that the bias voltage VRT is inputted to it, and the other connection of the switch 30 is connected so that the bias voltage VRB is inputted to it.

One output (Vo−) of the amplifier 23 is connected to the other connection of the switch 31, and the other output (Vo+) of the amplifier 23 is connected to one connection of the switch 32.

The capacitors 19 and 20 sample the black-level signal and the pixel signal of the sensor signals, respectively. The amplifier 23 amplifies the differential voltage between the pixel signal and the black-level signal. The capacitors 21 and 22 are feedback capacities connected between the input and output of the amplifier 23.

The operations of the switches 24 and 25 are controlled by the clock signal Φ1, and the operation of the switch 26 is controlled by the clock signal Φ1b. The operations of the switches 27 and 28 are controlled by the clock signal Φ1a, the operations of the switches 29 and 30 are controlled by the signal Φ2, and the operations of the switches 31 and 32 are controlled by the signal Φ2b.

FIG. 16 is a timing chart showing respective operation timings of the switches 24 to 32.

The gain of the CDS amplifier 5 is set based on a ratio Cs1/Cf1 between a sampling capacity Cs1 of the capacitor 19 and a feedback capacity Cf1 of the capacitor 21.

As shown in FIG. 16, in sampling the sensor signals, the switches 24, 25, 27, 28, 29, and 30 are turned on, respectively. The other connections of the capacitors 19 and 20 and one connections of the capacitors 21 and 22, that is, the inputs of the amplifier 23 are biased to the bias voltage VRM, and the other connections of the capacitors 21 and 22 are biased to the bias voltages VRT and VRB, respectively.

In the amplification, the switches 26, 31, and 32 are turned on and the other switches 24, 25, and 27 to 30 are turned off. Therefore, one connections (sensor-signal input sides) of the capacitors 19 and 20 are short-circuited, and the other connections of the capacitors 19 and 20 are separated from the bias voltage VRM. Additionally, the outputs of the amplifier 23 are connected to the other connections of the capacitors 21 and 22, respectively.

Note that the bias voltages VRT, VRM, and VRB satisfy the relation "VRT>VRM>VRB" in magnitude and the bias voltage VRM is the output common-mode voltage of the amplifier 22.

The CDS amplifier 5 can programmably control its gains by adjusting sampling capacities Cs1 and Cs2 and feedback capacities Cf1 and Cf2. If this embodiment is combined with the above-mentioned image-sensor signal-processing circuits 1 and 1a to 1c according to the present invention, at the time of selecting the CCD sensor in the sensor-signal sampling capacitor the pixel signal is sampled in the capacitor 19 and the black-level signal is sampled in the capacitor 20, and at the time of selecting the CMOS sensor the black-level signal is sampled in the capacitor 19 and the pixel signal is sampled in the capacitor 20.

FIG. 17 is an explanatory diagram showing input/output characteristics of the CDS amplifier 5. FIG. 17 shows the input (pixel signal−black-level signal) dependency of the output ((Vo+)−(Vo−)) of the amplifier 22 on the CDS amplifier 5.

The pixel signal is smaller than the black-level signal in the case of the CCD sensor, and the pixel signal is larger than the black-level signal in the case of the CMOS sensor. Therefore, an operation range parts right and left with respect to a boundary of the Y axis, as seen from FIG. 17.

The CDS amplifier 5 is characterized in that, when the difference between the pixel signal and the black level is zero, the level is shifted so as to satisfy the relation the output ((Vo+)−(Vo−))=VRB−VRT. This level shift is achieved by biasing the other connections of the capacitors 21 and 22 up to a voltage different from the bias voltages VRT and VRB at the time of the signal sampling.

Thus, in this fourth embodiment, a level shift circuit used only for such level shift can be eliminated.

(Fifth Embodiment)

Figure 19:
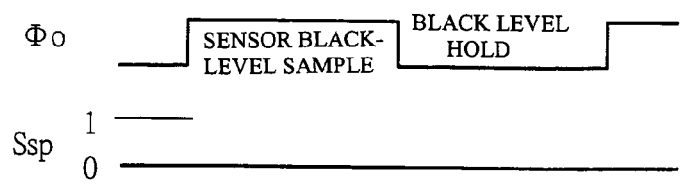
FIG. 19 is a timing chart at the time of double sampling of the black-level S/H amplifier shown in FIGS. 18A–D.
Figure 20:
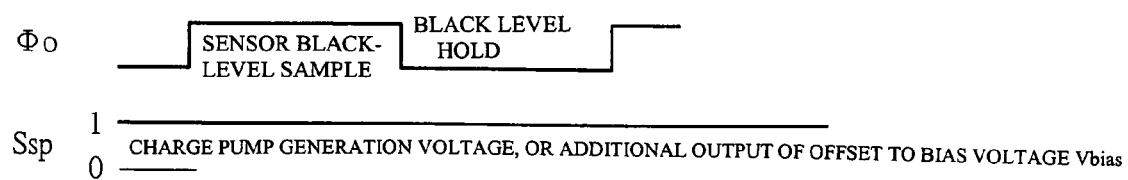
FIG. 20 is a timing chart at the time of single sampling in the black-level S/H amplifier shown in FIGS. 18A–D.

FIGS. 18A–D are an explanatory diagram showing a configuration example of the black-level S/H amplifier 2 according to a fifth embodiment of the present invention; FIG. 19 is a timing chart at the time of a double sampling in the black-level S/H amplifier shown in FIGS. 18A–D; and FIG. 20 is a timing chart at the time of a single sampling in the black-level S/H amplifier shown in FIGS. 18A–D.

In a fifth embodiment, FIGS. 18A to 18D show four configuration examples of the black-level S/H amplifiers 2 as shown in FIGS. 1, 6, 11, and 12, respectively.

The black-level S/H amplifier 2 is operated in synchronization with the sampling clock signal Φ0 and is controlled by the control signal for selecting the double or single sampling (FIG. 2).

Control signals for selecting the double or single sampling are generated by the control circuit 9 based on the sample selection data Ssp set as one piece of operating-condition setting data in the register 8 (FIG. 1).

FIG. 19 is a timing chart at the time of a double sampling in the black-level S/H amplifier 2, and FIG. 20 is a timing chart at the time of a single sampling in the black-level S/H amplifier 2.

As shown in FIG. 19, the black level of the sensor signal is sampled by the capacitor CBLH that is a sampling capacity when the sampling clock signal Φ0=the symbol '1', whereas the black level of the sensor signal is hold-outputted when the sampling clock signal Φ0=the symbol '0'. The offset voltage of the image-sensor signal-processing circuit, or the like is superposed on the hold-outputting by a voltage determined by the output of the charge pump.

When Ssp=the symbol '1', the black-level S/H amplifier 2 is not clock-operated and is operated continuously, and a voltage determined by the charge pump or a voltage obtained by superposing, on the bias voltage Vbias, the offset voltage determined by the charge pump is constantly outputted.

Figure 18A:
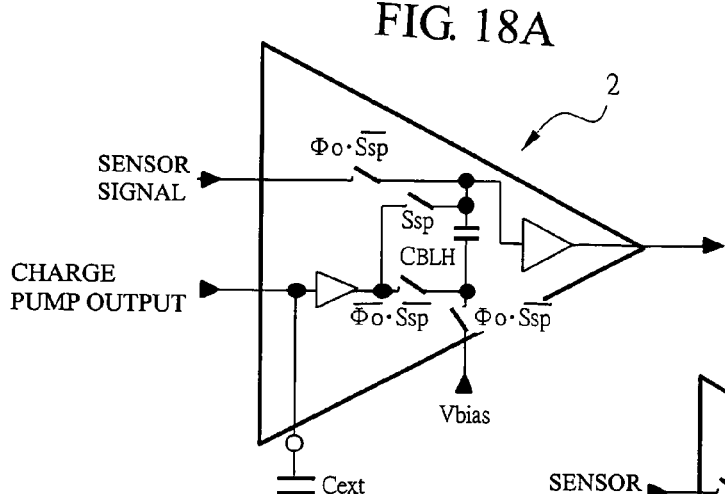
FIGS. 18A–D are explanatory diagram showing a configuration example of a black-level S/H amplifier according to a fifth embodiment of the present invention.
Figure 18B:
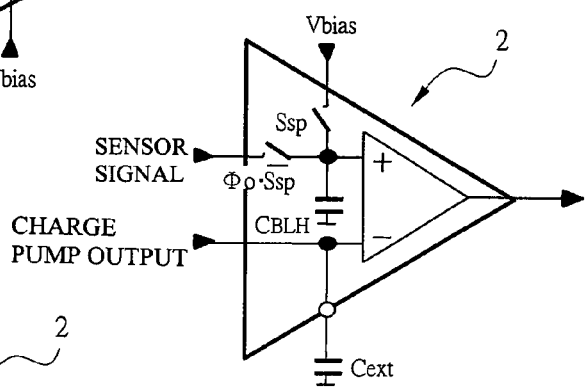
Figure 18C:
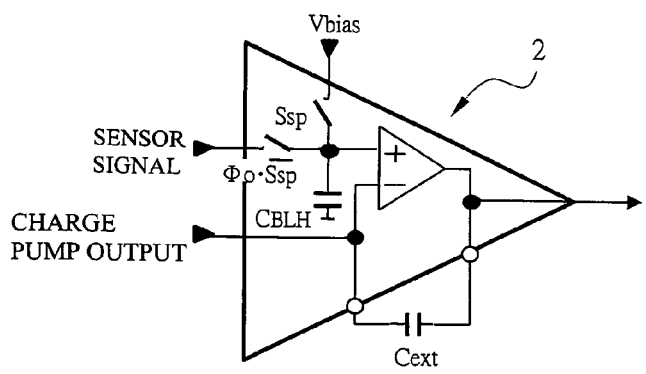
Figure 18D:
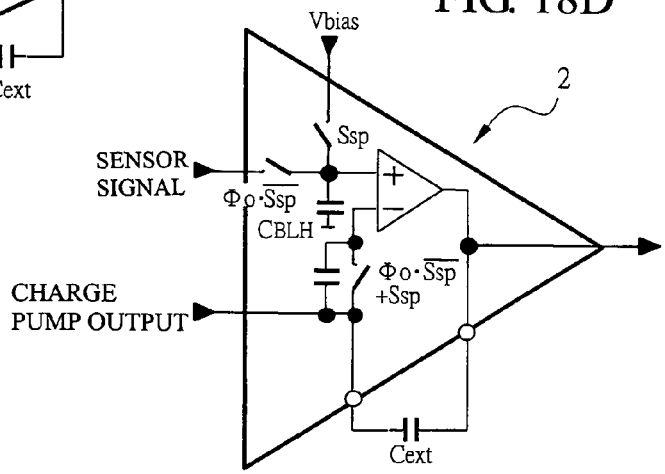

Incidentally, the charge pump voltage including the offset voltage is outputted in the configuration shown in FIG. 18A, and a voltage obtained by superposing, on the bias voltage Vbias, the offset voltage determined by the charge pump voltage is outputted in the configurations shown in FIGS. 18B to 18D.

In FIGS. 18A and 18B, a voltage is determined by the fact that the charge pump charges/discharges the external capacitor Cext connected to the paired fixed voltage. On the other hand, in FIGS. 18C and 18D, the charge pump charges/discharges an amplifier-input end side of the external capacitor Cext connected between the input and output of the amplifier.

In FIGS. 18A and 18B, one end of the external capacitor Cext is used as the fixed voltage. Therefore, from the viewpoint of a semiconductor integrated circuit device such as an LSI, there are advantages of reducing the number of pins and lessening external noise-transmission paths.

However, since the offset to a signal processing circuit is superposed on the amplifier output, the hold-outputting time differs from the black-level-signal sampling time in some cases and is varied in synchronization with the sampling clock signal Φ0.

On the other hand, the external capacitor Cext in FIGS. 18C and 18D is connected between the input and output of the amplifier. Therefore, from the viewpoint of the semiconductor integrated circuit device, there are the disadvantages that as the number of pins is increased, the possibility that external noises will be mixed therein is increased.

In the black-level S/H amplifier 2 shown in FIGS. 18A–D, the amplifier output at the hold-outputting time is almost equal that at the black-level signal sampling time. Therefore, there is the advantage that a variation of the amplifier output is small even when operated in synchronization with the sampling clock signal Φ0.

(Sixth Embodiment)

Figure 21:
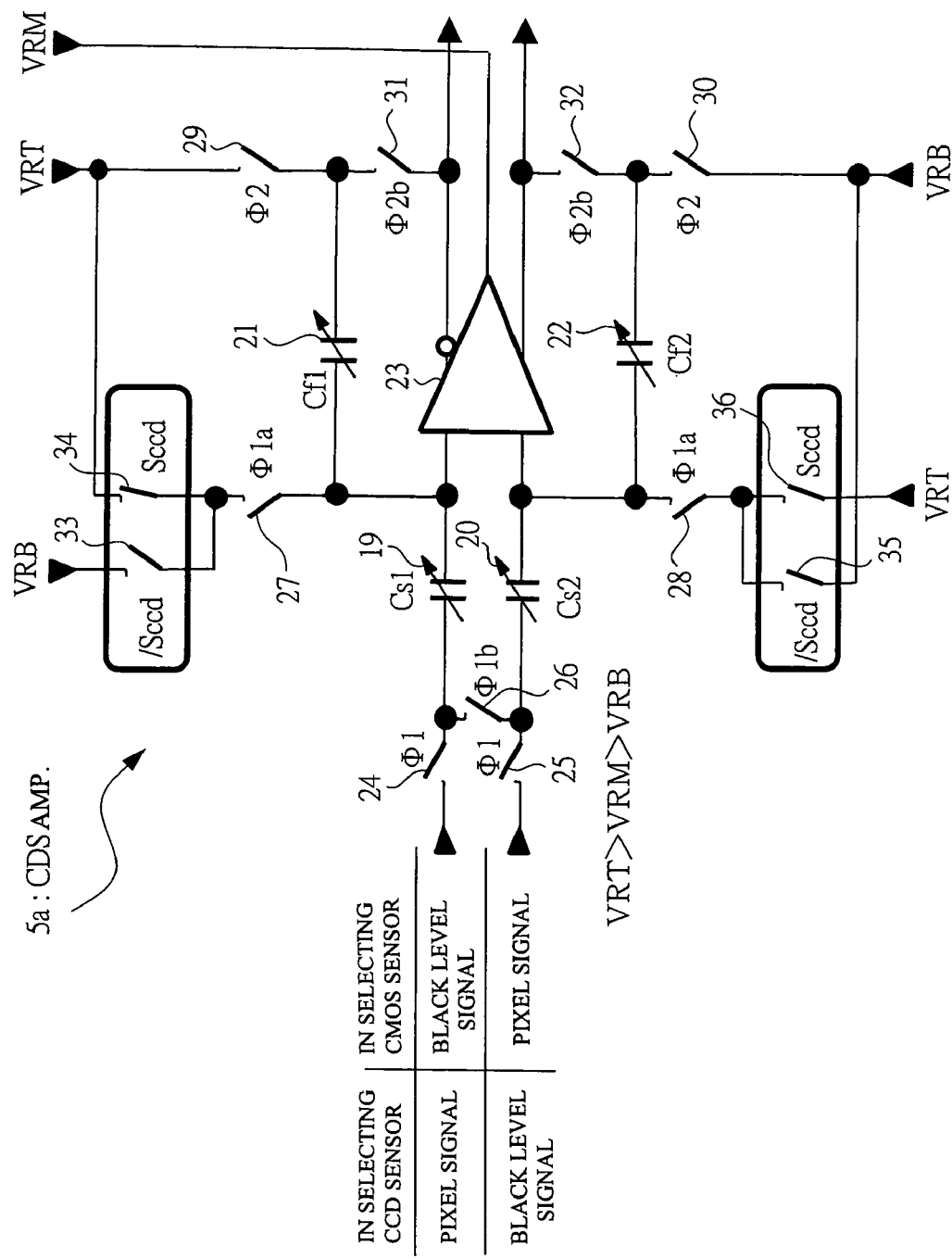
FIG. 21 is an explanatory diagram showing a configuration example of a CDS amplifier according to a sixth embodiment of the present invention.
Figure 22:
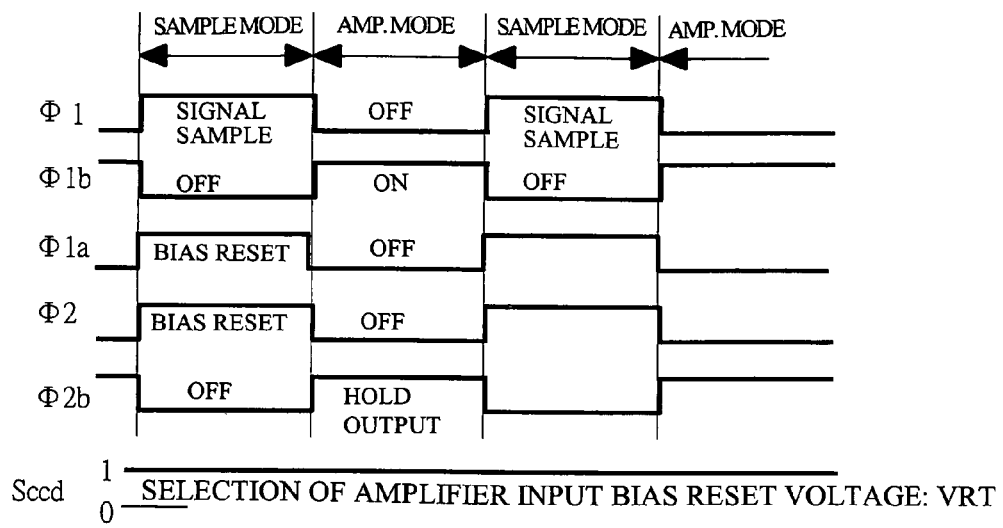
FIG. 22 is a timing chart showing operation timing of each switch provided in the CDS amplifier shown in FIG. 21.
Figure 23:
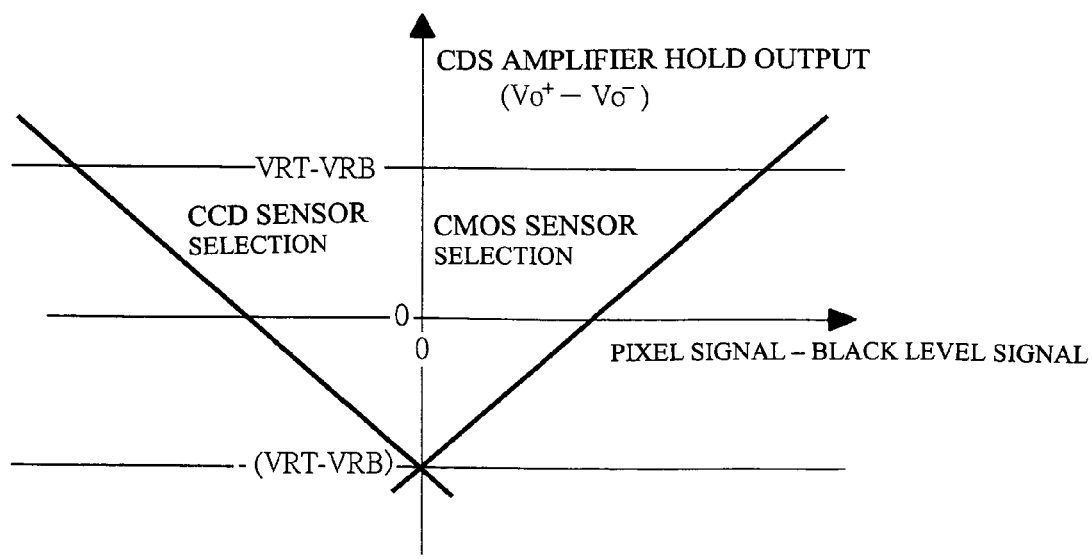
FIG. 23 is an explanatory diagram of input/output characteristics of the CDS amplifier shown in FIG. 21.

FIG. 21 is an explanatory diagram showing a configuration example of a CDS amplifier according to a sixth embodiment of the present invention; FIG. 22 is a timing chart showing an operation timing of each switch provided in the CDS amplifier shown in FIG. 21; and FIG. 23 is an explanatory diagram of input/output characteristics of the CDS amplifier shown in FIG. 21.

In a sixth embodiment, as shown in FIG. 21, a CDS amplifier (first amplifier) 5a is obtained by newly adding switches 33 to 36 to the configuration having the capacitors 19 to 22, the amplifier 23, and the switches 24 to 32 as shown in FIG. 15.

One connection of the switch 33 is connected so that the bias voltage VRB is inputted to it, and one connection of the switch 34 is connected so that the bias voltage VRT is inputted to it. One connection of the switch 27 is connected to the other connections of the switches 33 and 34.

The other connection of the switch 28 is connected to one connections of the switches 35 and 36, and the other connections of the switches 35 and 36 are connected so that the bias voltage VRT is inputted to them. Since the other connection in this configuration is identical to that shown in FIG. 15, the description thereof will be omitted.

Also, FIG. 22 is a timing chart showing operation timings of the switches 24 to 32 and 33 to 36.

As compared to the CDS amplifier 5 shown in FIG. 15, the characteristic of the CDS amplifier 5a is that a voltage different from the bias voltage VRM which is the output common-mode voltage of the amplifier 23 is used as the bias voltage of the input of the amplifier 23.

By so doing, a large bypass capacitor for making the bias voltage VRM low impedance becomes unnecessary, whereby the pins used for adding the external bypass capacitor to the bias voltage VRM can be reduced.

Additionally, in the CDS amplifier 5 (FIG. 15), since the other connections of the capacitors 19 and 20 that are the sampling capacities are biased to the bias voltage VRM at the time of the sampling of the sensor signal, an impulsive transient current synchronized with the clock signals (Φ1, Φ1a, Φ2, and Φ2b) is carried in a circuit for applying the bias voltage VRM. Therefore, if the bias voltage VRM has no low impedance, there arises the problem that the bias voltage VRM is varied and thereby the sampling cannot be made with high accuracy.

For this reason, as shown in FIG. 21, the bias voltage VRT or VRB is set as the bias of the input of the amplifier 23, whereby a large bypass capacitor to the bias voltage VRM can be eliminated.

However, at the time of the holding operation of the amplifier 23, a varying direction of the input common-mode voltage of the amplifier 23 is changed from the input bias voltage depending on the type of the sensor signal. The input common-mode voltage becomes lower than the bias voltage in the CCD sensor, and becomes higher in the CMOS sensor.

Therefore, in order to bias it up to the bias voltage VRT or VRB, it is necessary to enlarge the input operation range of the amplifier 23, and it becomes impossible to cope with both of the sensors under the condition of the low power supply voltage.

Thus, the input common-mode voltage of the amplifier 23 is controlled within an operable range of the input common-mode voltage by selecting the bias voltage of the amplifier 23 depending on the image sensor.

By the control signal outputted from the control circuit 9 based on the sensor selection data Sccd stored in the register 8, this embodiment copes with the CCD sensor when Sccd=the symbol '1', and the bias of the input copes with the CMOS sensor at the bias voltage VRT when Sccd=the symbol '0', whereby the end bias of the input becomes the bias voltage VRB.

Also, input/output characteristics of the CDS amplifier 5a are shown in FIG. 23. As shown in FIG. 23, the input/output characteristics are the same as those of the CDS amplifier 5 (FIG. 17) described in the fourth embodiment.

Therefore, the CDS amplifier 5a easily operated even under the condition of the low power supply voltage can be realized in this sixth embodiment.

(Seventh Embodiment)

FIGS. 24A–D are is an explanatory diagram showing a configuration example of a black-level S/H amplifier according to a seventh embodiment of the present invention; FIG. 25 is a timing chart at the time of the double sampling of the black-level S/H amplifier shown in FIGS. 24A–D and FIG. 26 is a timing chart at the time of the single sampling of the black-level S/H amplifier shown in FIGS. 24A–D show.

Figure 24:
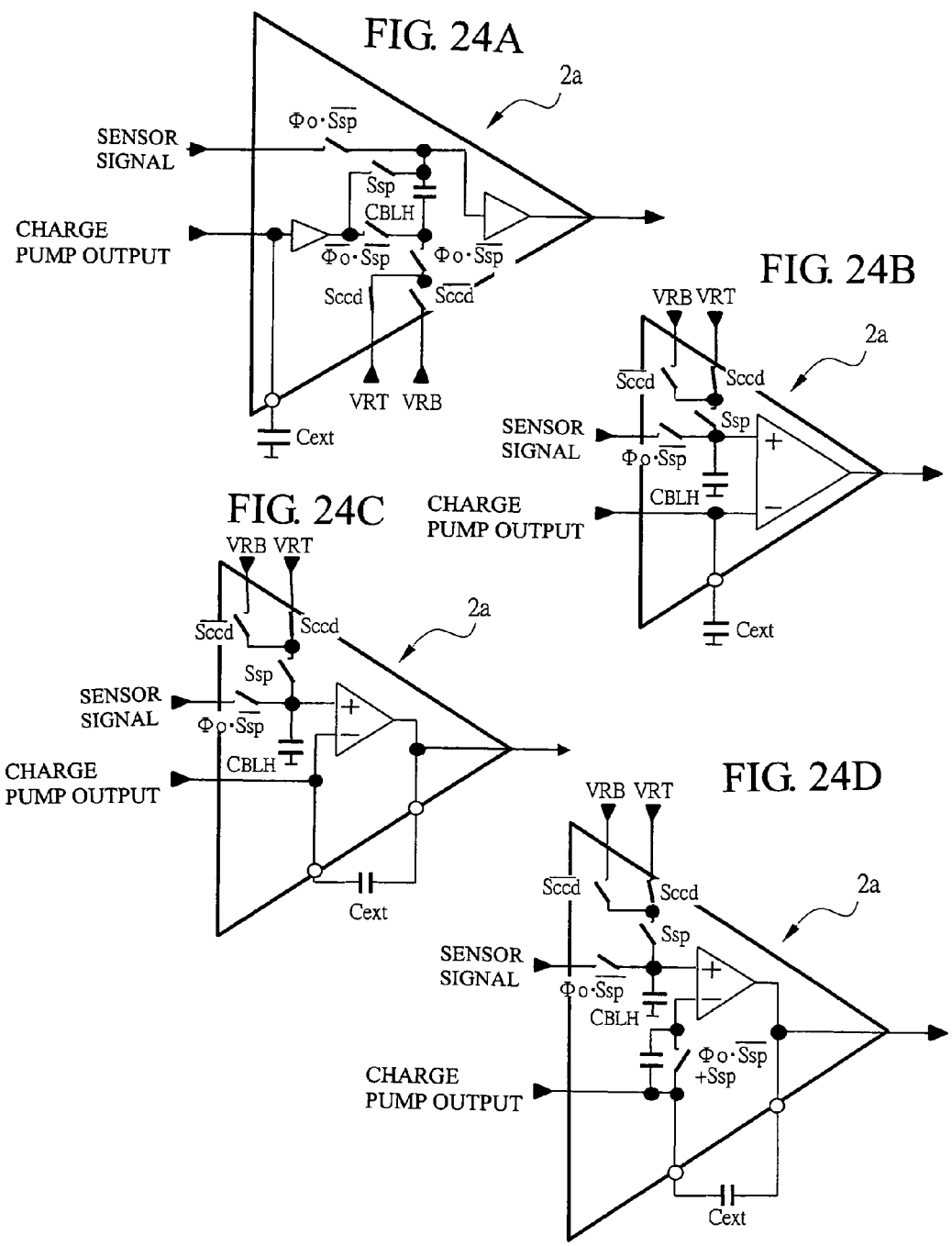
FIG. 24A–D is an explanatory diagram showing a configuration example of a black-level S/H amplifier according to a seventh embodiment of the present invention.
Figure 25:
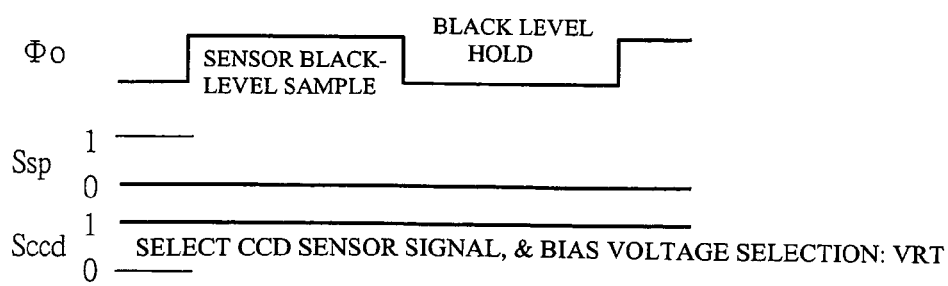
FIG. 25 is a timing chart at the time of double sampling in the black-level S/H amplifier shown in FIGS. 24A–D.
Figure 26:
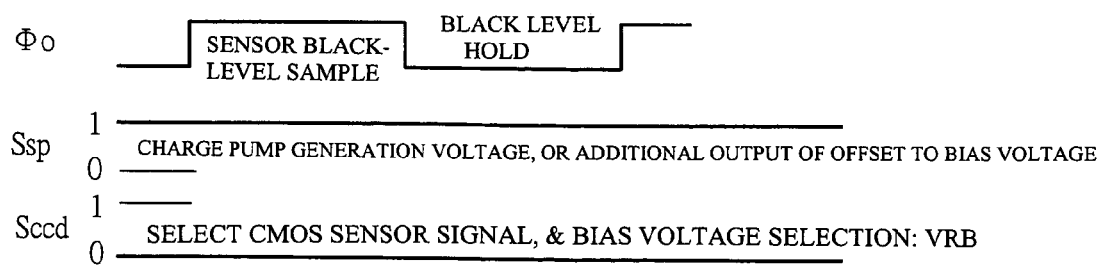
FIG. 26 is a timing chart at the time of single sampling in the black-level S/H amplifier shown in FIGS. 24A–D.

In a seventh embodiment, FIG. 24 shows the other configuration examples of the black level S/H amplifier in each of FIGS. 4, 8, 10, and 13.

The difference between the black-level S/H amplifier 2a and the black-level S/H amplifier 2 shown in FIGS. 18A–D are is that the bias voltage Vbias can be selected from the bias voltage VRT or VRB depending on the image sensor.

By the control signal outputted from the control circuit 9 based on the sensor selection data Sccd stored in the register 8, this embodiment can cope with the CCD sensor when Sccd='1', whereby the bias voltage VRT is selected as a bias voltage. Further, this embodiment can cope with the CMOS sensor when Sccd='0', whereby the bias voltage VRB is selected as a bias voltage.

Therefore, according to this seventh embodiment, it becomes possible to operate the black-level S/H amplifier 2a under the condition of the low power supply voltage.

(Eighth Embodiment)

Figure 27:
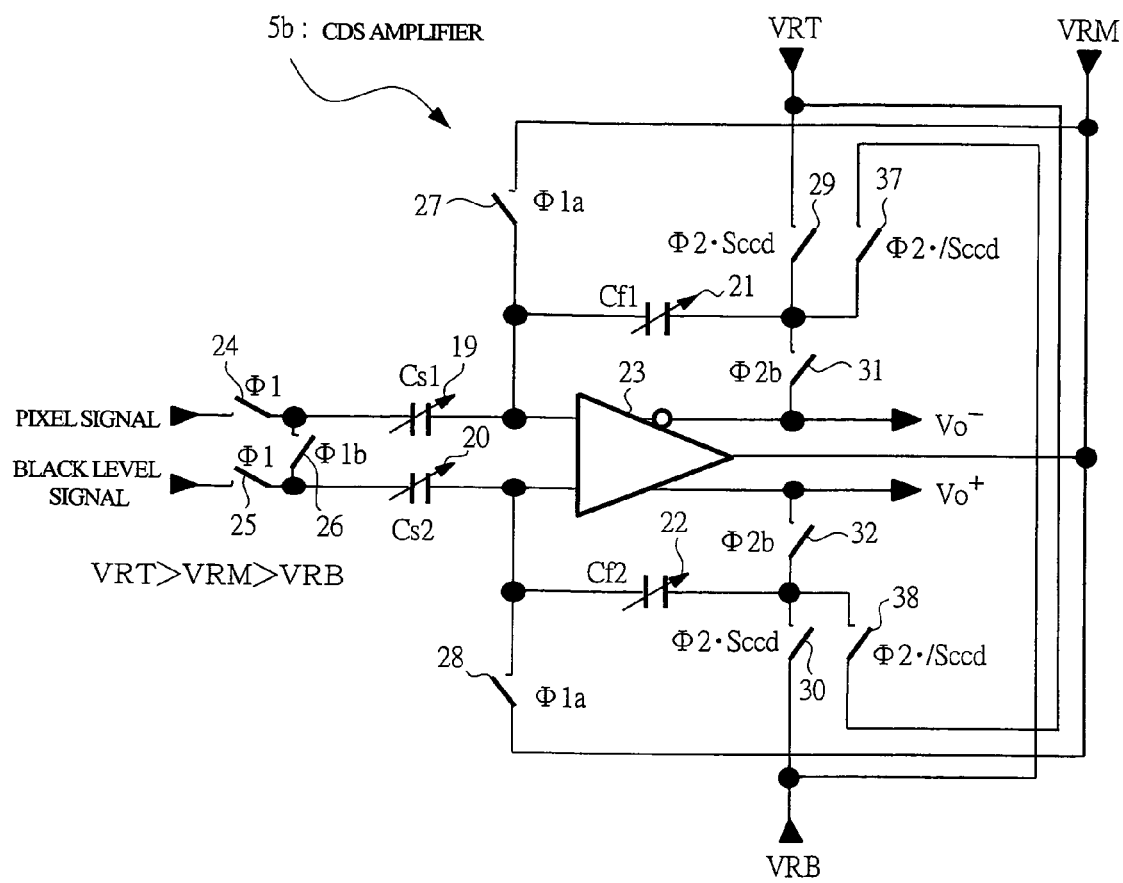
FIG. 27 is an explanatory diagram showing a configuration example of a CDS amplifier according to an eighth embodiment of the present invention.
Figure 28:
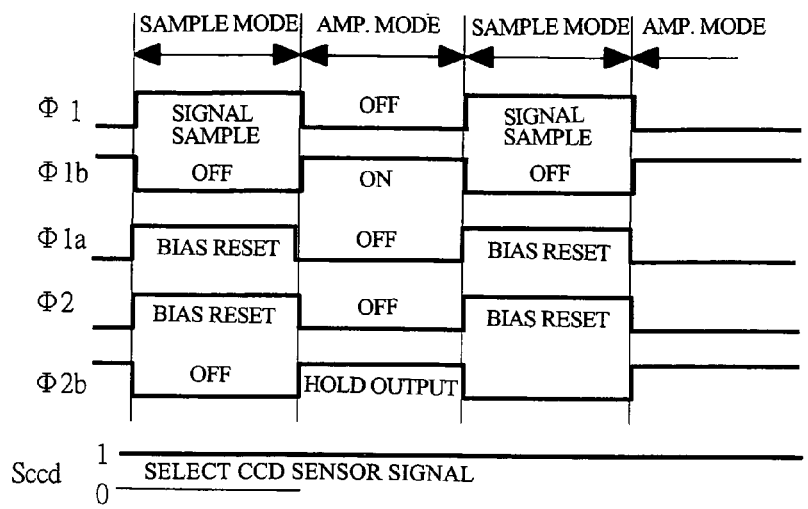
FIG. 28 is a timing chart showing operation timing of each switch provided in the CDS amplifier shown in FIG. 27.
Figure 29:
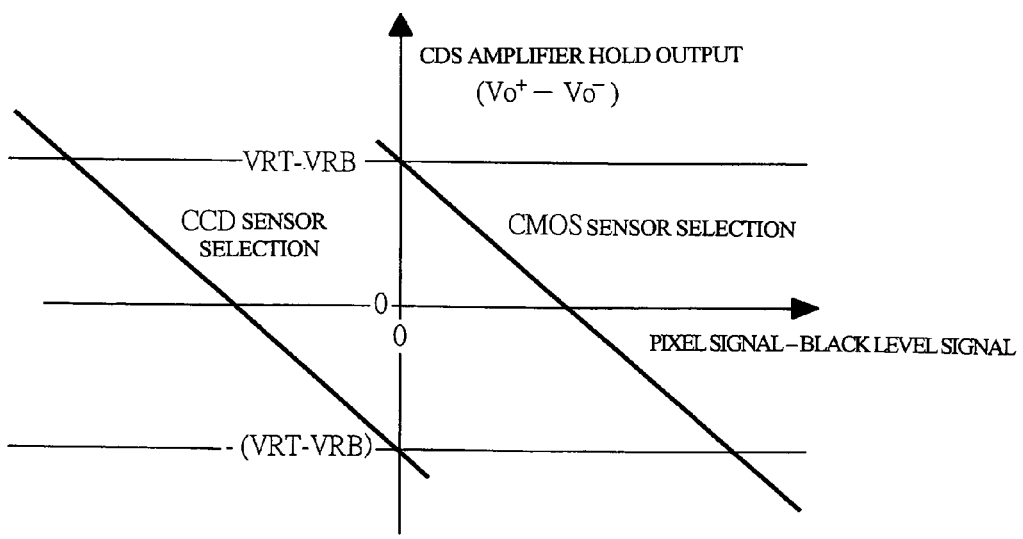
FIG. 29 is an explanatory diagram of the input/output characteristics in the CDS amplifier shown in FIG. 27.

FIG. 27 is an explanatory diagram showing a configuration example of a CDS amplifier according to an eighth embodiment of the present invention; FIG. 28 is a timing chart showing an operation timing of each switch provided in the CDS amplifier shown in FIG. 27; and FIG. 29 is an explanatory diagram of input/output characteristics in the CDS amplifier shown in FIG. 27.

In an eighth embodiment, FIG. 27 is an explanatory diagram showing the other configuration example of the CDS amplifier (first amplifying portion) provided in the image-sensor signal-processing circuit in which the sensor selecting switch is connected to a latter stage of the CDS amplifier as shown in each of FIGS. 11 to 14.

As shown in FIG. 27, a CDS amplifier 5b is obtained by newly adding switches 37 and 38 to the configuration of the CDS amplifier 5 (FIG. 15) comprising the capacitors 19 to 22, the amplifier 23, and the switches 24 to 32.

The other connection of the capacitor 19 is connected to one connection of the switch 37, and the other connection of the capacitor 22 is connected to the other connection of the switch 38.

The other connection of the switch 37 is connected so that the bias voltage VRB is inputted to it, and the other connection of the switch 38 is connected so that the bias voltage VRT is inputted to it. Also, the timing chart showing the operation timings of these switches 24 to 32, 37, and 38 is shown in FIG. 28.

Thus, this CDS amplifier 5b has the configuration in which the bias voltage at the time of sampling the capacitors 21 and 22 that are feedback capacities is selected since the sensor signal is selected on an output side, not on an input side.

When the pixel signal and the black-level signal are sampled as the capacities (first and second sampling capacity elements) Cs1 and Cs2, each of which is a sampling capacity, the capacitors (first and second feedback capacity elements) Cf1 and Cf2 are biased to the bias voltage VRT or VRB.

This embodiment can cope with the CCD sensor when the sensor selection data Sccd set in the register 8 is '1' (Sccd='1'), and the capacitor 21 is biased to the bias voltage VRT and the capacitor 22 is biased to the bias voltage VRB.

To the contrary, when Sccd='0', the capacitor 21 is biased to the bias voltage VRB and the capacitor 22 is biased to the bias voltage VRT. Note that the case where the input of the amplifier 23 is also biased to the bias voltage VRM is shown here.

The input/output characteristics of the CDS amplifier 5b are shown in FIG. 29. The characteristics in the case where the CCD sensor is selected are represented by the solid line on a left side of FIG. 29. If the CMOS sensor signal is inputted in this state, the characteristics in this case can be obtained by directly extrapolating the characteristics of the CCD sensor on a positive input side.

This causes the increase of the output amplitude of the amplifier, so that it becomes necessary to take a more output range of the amplifier. For its prevention, the output range is shifted as shown on the right side of FIG. 29, which represents the characteristics in the case where the CMOS is selected.

Figure 30:
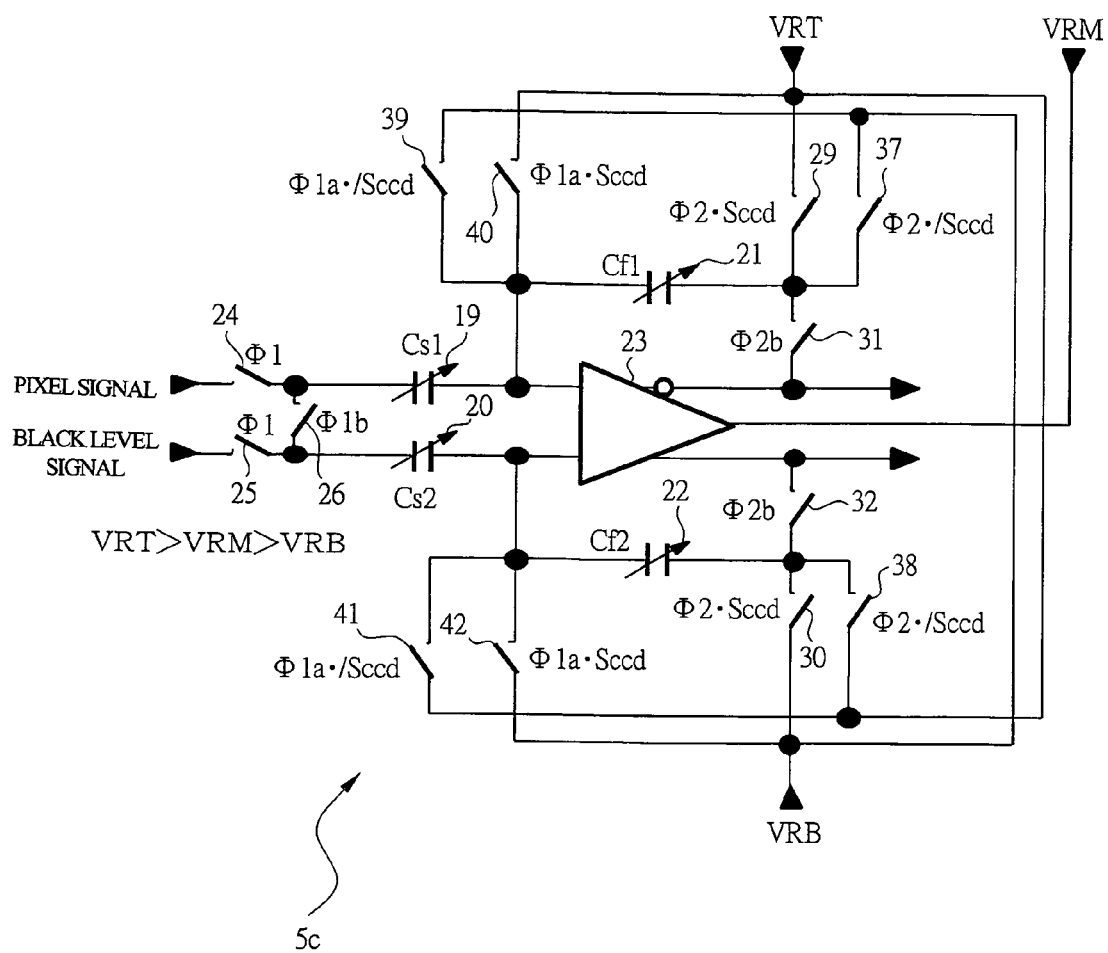
FIG. 30 is a block diagram showing an example of an image-sensor signal-processing circuit according to another embodiment of the present invention.

Also, FIG. 30 is an explanatory diagram showing another configuration example of the CDS amplifier (first amplifying portion) provided in the image-sensor signal-processing circuit in which the sensor selecting switch 3 is connected to a latter stage of the CDS amplifier.

As shown in FIG. 30, the configuration of a CDS amplifier 5c is obtained by newly adding switches 39 to 42 to the configuration of the CDS amplifier 5b (FIG. 27) comprising the capacitors 19 to 22, the amplifier 23, and the switches 24 to 26, 29 to 32, 37, and 38.

One connection of the switch 39 and the other connection of the switch 42 are connected so that the bias voltage VRB is inputted to them. One connection of the switch 40 and the other connection of the switch 41 are connected so that the bias voltage VRT is inputted to them.

Figure 31:
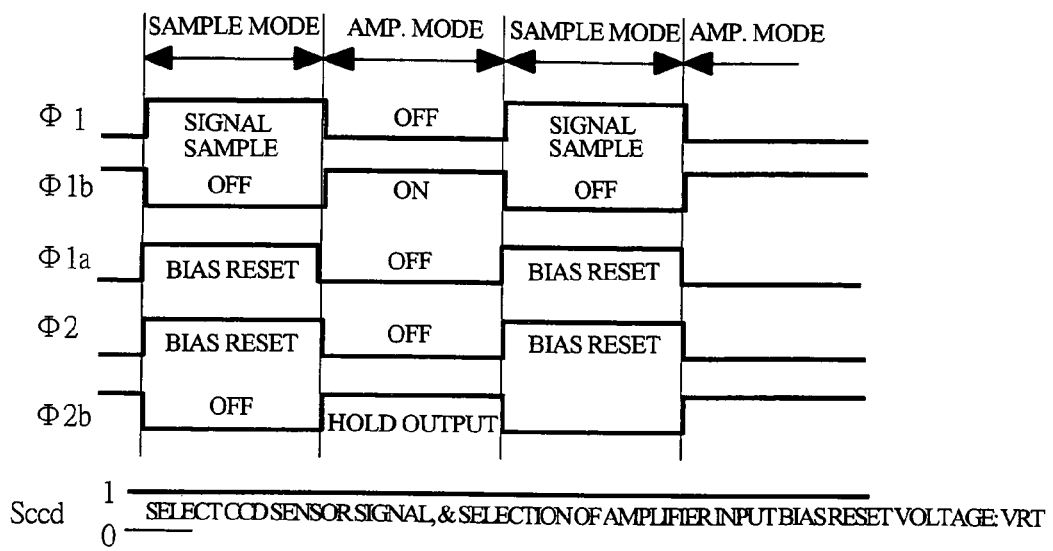
FIG. 31 is a timing chart showing operation timing of each switch provided in a CDS amplifier shown in FIG. 30.

One connection of the capacitor 21 is connected to the other connections of the switches 39 and 40, and the other connection of the capacitor 22 is connected to one connections of the switches 41 and 42. Also, FIG. 31 is a timing chart showing operation timings of these switches 24 to 26, 29 to 32, 37, 38, and 39 to 42.

Thus, this CDS amplifier 5c has a structure in which the bias of the input of the amplifier 23 at the time of the sampling is selected depending on the sensor.

Figure 32:
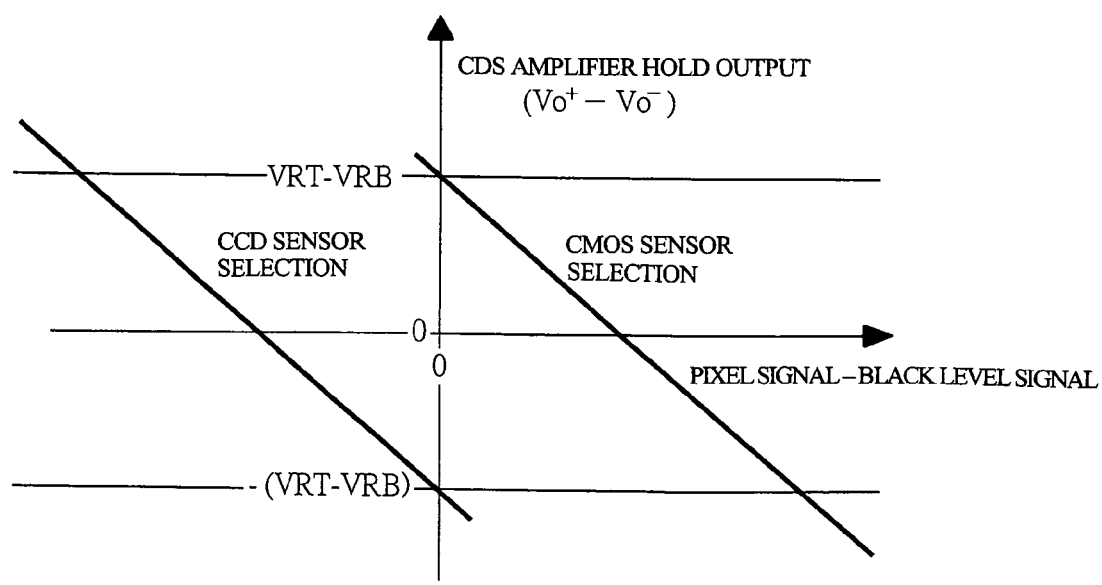
FIG. 32 is an explanatory diagram of the input/output characteristics of the CDS amplifier shown in FIG. 30.

Additionally, the input/output characteristics of the CDS amplifier 5c are shown in FIG. 32. Also in this case, the characteristics at the time of selecting the CCD sensor are represented by the solid line on the left side of FIG. 32, and those at the time of selecting the CMOS sensor are represented by the solid line on the right side thereof.

At this time, the capacitor is biased to the bias voltage VRT when the sensor selection data Sccd set in the register 8 is '1' (Sccd='1'), and is biased to the bias voltage VRB when Sccd='0'.

Therefore, by using this configuration of the CDS amplifier 5c, an operation of the circuit even under the condition of the low power supply voltage can be achieved.

In the foregoing, the invention made by the inventors has been concretely described based on the embodiments. However, needless to say, the present invention is not limited to the foregoing embodiments, and can be variously modified and altered without departing from the gist thereof.

The effects obtained by the typical ones of the inventions disclosed in this application will be briefly described as follows.

(1) Since it is possible to flexibly cope with both of the CCD and CMOS sensors by using the simple circuit configuration, the cost reduction and the size reduction of the semiconductor integrated circuit device provided with the image-sensor signal-processing circuit can be achieved.

(2) Also, by applying the present invention to the digital camera system etc., the above-mentioned item (1) makes it possible to achieve the cost reduction and the size reduction of the digital camera system.

What is claimed is:

1. A semiconductor integrated circuit device, comprising:
a black-level sample/hold amplifier sampling and holding a black-level signal outputted from either of a first or second image sensor;
a sensor selecting section selecting, based on a selection control signal, each output destination of the pixel signal outputted from either of said first or second image sensor and of the black-level signal outputted from said black-level sample/hold amplifier;
a first amplifying portion sampling/holding the black-level signal and the pixel signal, and amplifying the black-level signal and the pixel signal;
a second amplifying portion amplifying the black-level signal and the pixel signal outputted from said first amplifying portion; and
an A/D converter converting, to a digital signal, the black-level signal and the pixel signal outputted from said second amplifier,
wherein said sensor selecting section selecting a first line as the output destination of the black-level signal and a second line as the output destination of the pixel signal during coupled to the first image sensor, or selecting the first line as the output destination of the pixel signal and the second line as the output destination of the black-level signal pixel signal during coupled to the second image sensor,
wherein the black-level signal outputted from the first image sensor is smaller than the pixel level outputted from the first image sensor, and the black-level signal outputted from the second image sensor is larger than the pixel level outputted from the second image sensor.

2. The semiconductor integrated circuit device according to claim 1, further comprising:
a sensor selecting register for storing sensor selection data,
wherein the selection control signal is generated based on the sensor selection data set in the sensor selecting register.

3. The semiconductor integrated circuit device according to claim 1,
wherein said first image sensor is a CMOS sensor and said second image sensor is a CCD sensor, and the sensor selection data set in said sensor selecting register corresponds to each of output waveforms of the CMOS sensor at the time of double sampling, the CCD sensor, and the CMOS sensor at the time of single sampling.

4. The semiconductor integrated circuit device according to claim 1,
wherein said sensor selecting section is provided at a former or latter stage of said first amplifying portion or at a former stage of said A/D converter.

5. The semiconductor integrated circuit device according to claim 2, further comprising:
a first bias switch which supplies a bias voltage,
wherein said first bias switch supplies a bias voltage to said black-level sampling/hold amplifier when the black-level signal outputted from either of said first or second image sensor is inputted to said black-level sample/hold amplifier in a pre-blank period.

6. The semiconductor integrated circuit device according to claim 5,
wherein said first bias switch selects based on the sensor selection data set in said sensor selecting register, a first bias voltage outputted at the time of selecting said second image sensor or a second bias voltage outputted at the time of selecting said first image sensor, and outputs the selected bias voltage.

7. The semiconductor integrated circuit device according to claim 1, further comprising:
a bias amplifier amplifying a bias voltage; and
a second bias switch supplying, to said black-level sampling/hold amplifier, the bias voltage outputted from said bias amplifier when the black-level signal outputted from either of said first or second image sensor is inputted to said black-level sample/hold amplifier in a pre-blank period, and
said bias amplifier biases said black-level sample/hold amplifier so that an output of said black-level sample/hold amplifier becomes almost equal to the bias voltage.

8. The semiconductor integrated circuit device according to claim 7, further comprising:
a third bias switch provided for: selecting, based on the data set in said sensor selecting register, a first bias voltage outputted at the time of selecting said first image sensor or a second bias voltage outputted at the time of selecting said second image sensor; and outputting the selected bias voltage to said bias amplifier.

9. The semiconductor integrated circuit device according to claim 1,
wherein at least two different bias voltages are inputted to said black-level sample/hold amplifier, and
said black-level sample/hold amplifier selects any one of said at least two bias voltages based on the black-level signal outputted from either of said first or second image sensor and supplies the selected bias voltage.

10. The semiconductor integrated circuit device according to claim 1,
wherein said first amplifying portion comprises:
a first sampling capacity element sampling a black-level sample/hold amplifier output signal of the black-level signal outputted from either of said first or second image sensor;
a second sampling capacity element sampling the pixel signal outputted from either of said first or second image sensor;
a signal amplifying portion sampling a difference between the black-level sample/hold amplifier output signal and the pixel signal; and
first and second feedback capacity elements coupled between an input and an output of said signal amplifying portion, wherein when the black-level sample/hold amplifier output signal and the pixel signal are sampled to said first and second sampling capacity elements, a predetermined bias voltage is inputted to the input of said first amplifying portion and bias voltages are applied to said first and second feedback capacity elements.

11. The semiconductor integrated circuit device according to claim 1,
wherein said first amplifying portion comprises:
a first sampling capacity element sampling a black-level sample/hold amplifier output signal of the black-level signal outputted from either of said first or second image sensor;
a second sampling capacity element sampling the pixel signal outputted from either of said first or second image sensor;
a signal amplifier portion amplifying a difference between the black-level sample/hold amplifier output signal and the pixel signal; and first and second feedback capacity elements coupled between an input and an output of said signal amplifying portion,
wherein when the black-level sample/hold amplifier output signal and the pixel signal are sampled to said first and second sampling capacity elements, at least two bias voltages are supplied to the input of said first amplifying portion,
one predetermined bias voltage is selected from said at least two bias voltages depending on selection of said first or second image sensor, and
bias voltages are applied to said first and second feedback capacity elements.

12. The semiconductor integrated circuit device comprising:
a sensor selecting section selecting, based on a sensor selection data, a first state in which a black-level signal is transmitted to a second line during coupling to a CCD sensor, or a second state in which a pixel signal is transmitted to the first line and a black-level signal is transmitted to the second line during coupling to a CMOS sensor;
a first amplifying portion sampling/holding the black-level signal and the pixel signal outputted from either of the CCD sensor or CMOS senors, and amplifying the black-level signal and the pixel signal outputted from either of the CCD sensor or CMOS sensor; and
an A/D converter converting, to a digital signal, the black-level signal and the pixel signal outputted from said first amplifying portion;
wherein the pixel signal outputted from the CCD sensor is smaller than the black-level signal outputted from the CCD sensor,
wherein the pixel signal outputted from the CMOS sensor is larger than the black-level signal outputted from the CMOS sensor.

13. The semiconductor integrated circuit device according to claim 12,
wherein the first line and second line are coupled to an input of the first amplifying portion, or the first line and second line are coupled to an input of the A/D converter.

14. The semiconductor integrated circuit device comprising:
a sensor selecting section selecting, based on a sensor selection data, a first state in which a black-level signal is transmitted to a first line and a pixel signal is transmitted to a second line during coupling to a CCD sensor, or a second state in which a pixel signal is transmitted to the first line and a black-level signal is transmitted to the second line during coupling to a CMOS sensor;
a first amplifying portion sampling/holding the black-level signal and the pixel signal outputted from either of the CCD sensor or CMOS sensor, and amplifying the black-level signal and the pixel signal outputted from either of the CCD sensor or CMOS sensor; and
an A/D converter converting, to a digital signal, the black-level signal and the pixel signal outputted from said first amplifying portion;
wherein the pixel signal outputted from the CCD sensor is smaller than the black-level signal outputted from the CCD sensor,
wherein the pixel signal outputted from the CMOS sensor is larger than the black-level signal outputted from the CMOS sensor;
a second amplifying portion amplifying the black-level signal and the pixel signal outputted from said first amplifying portion,
wherein the first line and second line are coupled to a input of the second amplifying portion.

15. The semiconductor integrated circuit device comprising:
a sensor selecting section selecting, based on a sensor selection data, a first state in which a black-level signal is transmitted to a first line and a pixel signal is transmitted to a second line during coupling to a CCD sensor, or a second state in which a pixel signal is transmitted to the first line and a black-level signal is transmitted to the second line during coupling to a CMOS sensor;
a first amplifying portion sampling/holding the black-level signal and the pixel signal outputted from either of the CCD sensor or CMOS sensor, and amplifying the black-level signal and the pixel signal outputted from either of the CCD sensor or CMOS sensor; and
an A/D converter converting, to a digital signal, the black-level signal and the pixel signal outputted from said first amplifying portion;
wherein the pixel signal outputted from the CCD sensor is smaller than the black-level signal outputted from the CCD sensor,
wherein the pixel signal outputted from the CMOS sensor is larger than the black-level signal outputted from the CMOS sensor;
wherein the sensor selection data set in said sensor selecting register corresponds to each of output waveforms of the CMOS sensor at the time of double sampling, the CCD sensor, and the CMOS sensor at the time of single sampling.

* * * * *